United States Patent [19]

Miyawaki et al.

[11] Patent Number: 4,996,916
[45] Date of Patent: Mar. 5, 1991

[54] MACHINE FOR PRODUCING BEAN CURD

[75] Inventors: Takahiro Miyawaki; Yoshihito Kondo; Kojiro Hayashi; Michihiro Mashiba, all of Tokushima, Japan

[73] Assignee: Shikoku Kakoki Co., Ltd., Tokushima, Japan

[21] Appl. No.: 520,567

[22] Filed: May 8, 1990

[30] Foreign Application Priority Data

| May 10, 1989 | [JP] | Japan | 1-117856 |
| May 10, 1989 | [JP] | Japan | 1-117857 |
| May 10, 1989 | [JP] | Japan | 1-117858 |
| May 10, 1989 | [JP] | Japan | 1-117859 |
| May 10, 1989 | [JP] | Japan | 1-117860 |
| May 10, 1989 | [JP] | Japan | 1-117861 |
| May 29, 1989 | [JP] | Japan | 1-135113 |
| Jun. 2, 1989 | [JP] | Japan | 1-141641 |

[51] Int. Cl.⁵ ............ A23C 3/02; A23J 1/00; A23L 1/20
[52] U.S. Cl. .................. 99/453; 99/459; 99/465; 99/483; 99/496; 100/116; 100/125
[58] Field of Search .................. 99/353-356, 99/452, 453, 455, 456-459, 460, 465, 467, 473, 474, 477-479, 483, 484, 495, 496, 509, 510; 249/113; 100/115, 116, 118, 125

[56] References Cited

U.S. PATENT DOCUMENTS

| 761,686 | 6/1904 | Kirshner | 100/116 |
| 2,083,318 | 6/1937 | Damrow | 100/115 |
| 2,846,767 | 8/1958 | Hensgen et al. | 99/458 |
| 3,352,231 | 11/1967 | Thomson | 100/125 |
| 4,142,933 | 3/1979 | Graham | 100/116 |
| 4,509,413 | 4/1985 | Granberg et al. | 99/453 |
| 4,608,921 | 9/1986 | Mongiello, Sr. | 99/453 |
| 4,628,805 | 12/1986 | Derode | 99/465 |
| 4,750,415 | 6/1988 | Ostemar | 99/456 |
| 4,771,681 | 9/1988 | Nagata | 99/483 |
| 4,817,515 | 4/1989 | Bjerre et al. | 99/460 |

Primary Examiner—Timothy F. Simone
Attorney, Agent, or Firm—Armstrong, Nikaido Marmelstein Kubovcik & Murray

[57] ABSTRACT

A bean curd producing machine comprising soybean milk coagulating means, means for dewatering and shaping coagulated soybean milk and means for delivering bean curd shaped by dewatering. The coagulating means comprises a bucket conveyor disposed within a heating chamber and having coagulating buckets arranged in parallel rows, and a distributing trough disposed above the paths of travel of the buckets in all the rows thereacross and formed in its bottom wall with filling openings positioned immediately above the respective rows of buckets. The dewatering-shaping means comprises a bucket conveyor having press buckets arranged in parallel rows and each formed in a required portion with many dewatering apertures, a press bar disposed above the paths of travel of the press buckets in all the rows thereacross, and lids suspended from the press bar each by a spring, equal in number to the number of the press bucket rows and each provided for one press bucket. The delivering means comprises a lift disposed below the lower path of movement of the press bucket conveyor and having chucks for holding the press bar, and means for moving the lift upward and downward at a variable speed so that bean curd can be delivered as placed on the lids from the press buckets without collapsing.

10 Claims, 19 Drawing Sheets

4,996,916

MACHINE FOR PRODUCING BEAN CURD

BACKGROUND OF THE INVENTION

The present invention relates to a machine for producing bean curd, more particularly "momen tofu," or bean curd which is prepared usually with use of "momen" or cotton cloth.

Machines for producing "kinugoshi tofu" or fine-textured bean curd in large quantities are known which are adapted to fill coagulant-containing soybean milk into containers and coagulate the milk to obtain such bean curd as contained in the containers, whereas no machine is known for producing "momen tofu" or coarse-textured bean curd in large quantities as placed in containers by dewatering and shaping coagulated soybean milk.

For producing coarse-textured bean curd in a large quantity as placed in containers, it appears useful to fill coagulant-containing soybean milk into a plurality of buckets individually and coagulate the milk by heating. If the amount of milk filled in differs from bucket to bucket in this case, the velocity of coagulation will vary from bucket to bucket to result in uneven coagulation. No problem will arise if the soybean milk is coagulated over a sufficient period of time, but when it is attempted to rapidly coagulate the milk for quantity production, uneven coagulation is likely to occur since a mass of soybean milk has difficulty in conducting heat therethrough to its interior central portion.

Further it appears useful to dewater and shape coagulated soybean milk with use of press buckets each formed with a multiplicity of apertures not passing the coagulated milk therethrough but permitting removal of water from the coagulated milk therethrough, such that the coagulated milk is transferred from the coagulating buckets to the press buckets and then pressed at a stroke as placed in the press buckets. In this case, it is likely that the coagulated soybean milk in the press buckets will have surface irregularities or a slanting surface or will be filled in to varying levels. If such portions of coagulated milk is pressed at a stroke, the pressure applied will differ from bucket to bucket, failing to subject all milk portions to a uniform load to dewater the milk unevenly.

When the bean curd obtained by dewatering and shaping the coagulated milk is to be withdrawn from the press buckets and packed into containers, the bean curd as dewatered and shaped is hot and is therefore very soft and readily collapsible. Difficulties will be encountered in transferring the bean curd from the press buckets into the containers quickly without collapsing.

SUMMARY OF THE INVENTION

The main object of the present invention is to provide a machine for producing large quantities of momen or coarse-textured bean curd as placed in containers.

According to an aspect of the present invention, the invention provides a machine for producing bean curd having means for coagulating a mixture of soybean milk and a coagulant, and dewatering-shaping means for dewatering and shaping the coagulated soybean milk obtained by the coagulating means. The coagulating means comprises a heating chamber, a bucket conveyor disposed within the heating chamber and having coagulating buckets arranged in parallel rows, a distributing trough disposed above the paths of travel of the coagulating buckets in all the rows thereacross and formed in its bottom wall with filling openings positioned immediately above the respective rows of coagulating buckets, feed means for mixing together the soybean milk and the coagulant in specified quantities sufficient to fill one coagulating bucket in each of the rows and intermittently feeding the resulting mixture to the distributing trough, and means for opening and closing the filling openings after completion of the feeding operation by the feed means and before the next feeding operation is started.

The bean curd producing machine of the invention is adapted to distribute the mixture of soybean milk and coagulant to the coagulating buckets efficiently and uniformly.

When the coagulating bucket is formed at the center of its bottom wall with a uniformly heating portion which is inwardly bulged and inverted U-shaped in vertical section, the soybean milk in the bucket can be heated uniformly in its entirety and can therefore be coagulated uniformly.

When a lift member is disposed above the paths of travel of the coagulating buckets downstream from the distributing trough and provided with coagulated soybean milk collapsing members which are equal in number to the number of the coagulating bucket rows and which are movable into and out of the coagulating buckets, the coagulated soybean milk in the buckets is collapsible by moving the collapsing members into the buckets, with the result that the coagulated soybean milk can be dewatered effectively and smoothly withdrawn from the buckets without partly remaining therein According to another aspect of the present invention, the invention provides a bean curd producing machine having means for coagulating a mixture of soybean milk and a coagulant, and dewatering-shaping means for dewatering and shaping the coagulated soybean milk obtained by the coagulating means, the dewatering-shaping means comprising a bucket conveyor having press buckets arranged in parallel rows and each formed in required portions of the peripheral wall and the bottom wall thereof with a multiplicity of dewatering apertures not passing therethrough the coagulated soybean milk obtained by the coagulating means but permitting the water contained in the coagulated soybean milk to pass therethrough, a press bar movable upward and downward and disposed above the paths of travel of the press buckets in all the rows thereacross, lids upwardly and downwardly movably suspended from the press bar so as to be positioned immediately above the respective rows of press buckets and each downwardly biased by a spring, the lids being equal in number to the number of press bucket rows, means for lowering and raising the press bar so as to move the lids into and out of the respective press buckets, and restraining means for restraining the press bar from moving away from the press buckets but permitting the press bar to move toward the press buckets With the bean curd producing machine according to the second feature of the present invention, each lid advances into the press bucket while being subjected to the pressure of the spring, with the result that even if the level of the coagulated soybean curd placed in varies from bucket to bucket, the variation can be accommodated by the springs. Consequently, the coagulated soybean milk in all the press bucket can be subjected to a uniform load.

Further if the level of the uppermost dewatering apertures in the peripheral wall of the bucket from the bucket bottom is made approximately equal to the vertical thickness of the bean curd shaped, the coagulated soybean milk being shaped as placed in the bucket will not be defaced by the dewatering apertures until the vertical thickness of the milk becomes equal to the height of the uppermost apertures in the peripheral wall from the bottom. The bean curd obtained is therefore less prone to defacement over its peripheral surface and is neat and of higher commercial value.

The dewatering apertures, when tapered inward, are less likely to be clogged up.

The conveyor transport path may be provided therealong with a plurality of press stations, and means are disposed for gradually moving the press bar toward the press buckets stepwise at every station in corresponding relation with a reduction in the volume of coagulated soybean milk in the buckets While the coagulated soybean milk transported by the conveyor as placed in the buckets has its volume reduced by being pressed by the press bar through the lids and the springs, the press bar is then moved toward the buckets gradually stepwise at every station in corresponding relation to the reduction in the volume, so that despite the volume reduction, the coagulated soybean milk in the buckets is subjected to a load corresponding to the volume reduction. As a result, the coagulated soybean milk being transported by the conveyor can be suitably loaded for dewatering and shaping when the amount of movement of the press bar and the force of the springs are suitably determined.

Further arranged between the adjacent press stations are means for releasing the press bar from the means for restraining the press bar from moving away from the press buckets, and means for moving the released press bar away from the press buckets. The pressure acting on the milk in the buckets is therefore temporarily reduced by the movement of the press bar away from the buckets, whereby the milk is prevented from being forced into the dewatering apertures. This renders the bean curd readily removable from the press buckets after shaping.

According to another aspect of the present invention, the invention provides a bean curd producing machine having means for coagulating a mixture of soybean milk and a coagulant, dewatering-shaping means for dewatering and shaping the coagulated soybean milk obtained to prepare bean curd, and delivery means for delivering the bean curd from the dewatering-shaping means, the dewatering-shaping means comprising a bucket conveyor having press buckets arranged in parallel rows and each formed in a required portion with a multiplicity of dewatering apertures not passing therethrough the coagulated soybean milk obtained by the coagulating means but permitting the water contained in the coagulated soybean milk to pass therethrough, a press bar movable upward and downward and disposed above the paths of travel of the press buckets in all the rows thereacross, lids upwardly and downwardly movably suspended from the press bar so as to be positioned immediately above the respective rows of press buckets and each downwardly biased by a spring, the lids being equal in number to the number of press bucket rows, means for lowering and raising the press bar so as to move the lids into and out of the respective press buckets, and restraining means for restraining the press bar from moving away from the press buckets but permitting the press bar to move toward the press buckets, the delivery means comprising a lift disposed below the lower path of movement of the bucket conveyor for transporting bean curd as placed in the press buckets, release means for releasing the press bar from the restraining means when the press bar is positioned above the lift, a chuck provided on the lift for releasably holding the press bar, the lift being in an upper limit position when the chuck holds the press bar, in an intermediate position immediately after the bean curd as placed on the lids is removed from the press buckets, and in a lower limit position immediately before the bean curd as placed on the lids is to be transported to the next process, and means for moving the lift upward from the lower limit position to the upper limit position at a high speed and for moving the lift downward from the upper limit position to the intermediate position at a low speed and from the intermediate position to the lower limit position at a high speed.

With the bean curd producing machine according to the third aspect of the invention, the lift moves down at the low speed while the bean curd is being removed from the press bucket, whereby the bean curd is lowered through the bucket at the low speed and thereby withdrawn from the bucket. Consequently, the bean curd is prevented from collapsing, and the lift moves upward and downward at the high speed except during the removal period This assures rapid delivery of the bean curd from the buckets The lift is provided with a sensor for producing a signal for stopping the lift at the upper limit position when an actuator is brought into contact with the press bar positioned above the lift. The release means releases the press bar from the restraining means upon the lift reaching the upper limit position, the chuck holds the press bar, and the lift is thereafter lowered to remove the bean curd placed on the lid from the press bucket. Accordingly, after the lift has been stopped at the upper limit position by the contact of the sensor actuator with the press bar positioned above the lift, the distance between the stopped lift and the press bar, i.e., the distance between the chuck attached to the lift and the press bar, does not vary from bar to bar but is always the same for all press bars, even if the position of the press bucket relative to the lid with respect to the vertical direction differs from bucket to bucket. As a result, even if the amount of bean soybean milk varies from bucket bucket, the press bars can be accurately and rapidly held by the chucks.

BRIEF DESCRIPTION OF THE DRAWINGS

FIG. 4 is a perspective view partly broken away;

FIG. 5 is a view in vertical section;

FIG. 6 is a sectional view corresponding to FIG. 5 and showing a modification of the soybean milk distributing-filling device;

FIG. 11 is a perspective view partly broken away and showing a press bucket and a lid along with means associated therewith;

FIG. 12 is a view in vertical section showing the same;

FIG. 13 is a view in vertical section showing lids with pressure applied thereto and neighboring parts;

FIG. 14 is a view in vertical section showing the same with a reduced pressure applied to the lids;

FIG. 15 is a perspective view of the press bucket and the lid;

FIG. 16 is an enlarged view in section of a dewatering aperture;

FIG. 17 is a perspective view partly broken away and showing the delivery device along with a bucket conveyor;

FIG. 18 is an enlarged view in vertical section showing a portion of FIG. 17;

FIG. 19 is an enlarged view in vertical section showing another portion of FIG. 17; and FIGS. 20 to 22 are diagrams showing a soybean removing operation.

DESCRIPTION OF THE PREFERRED EMBODIMENTS

An embodiment of the invention will be described below with reference to the drawings. In the following description, the terms "front" and "rear" refer respectively to the left-hand side and the righthand side of FIGS. 1 and 2, and the terms "right" and "left" are used as the machine is viewed from behind toward the front.

Brief Description of the Machine in its Entirety

Figure 1:
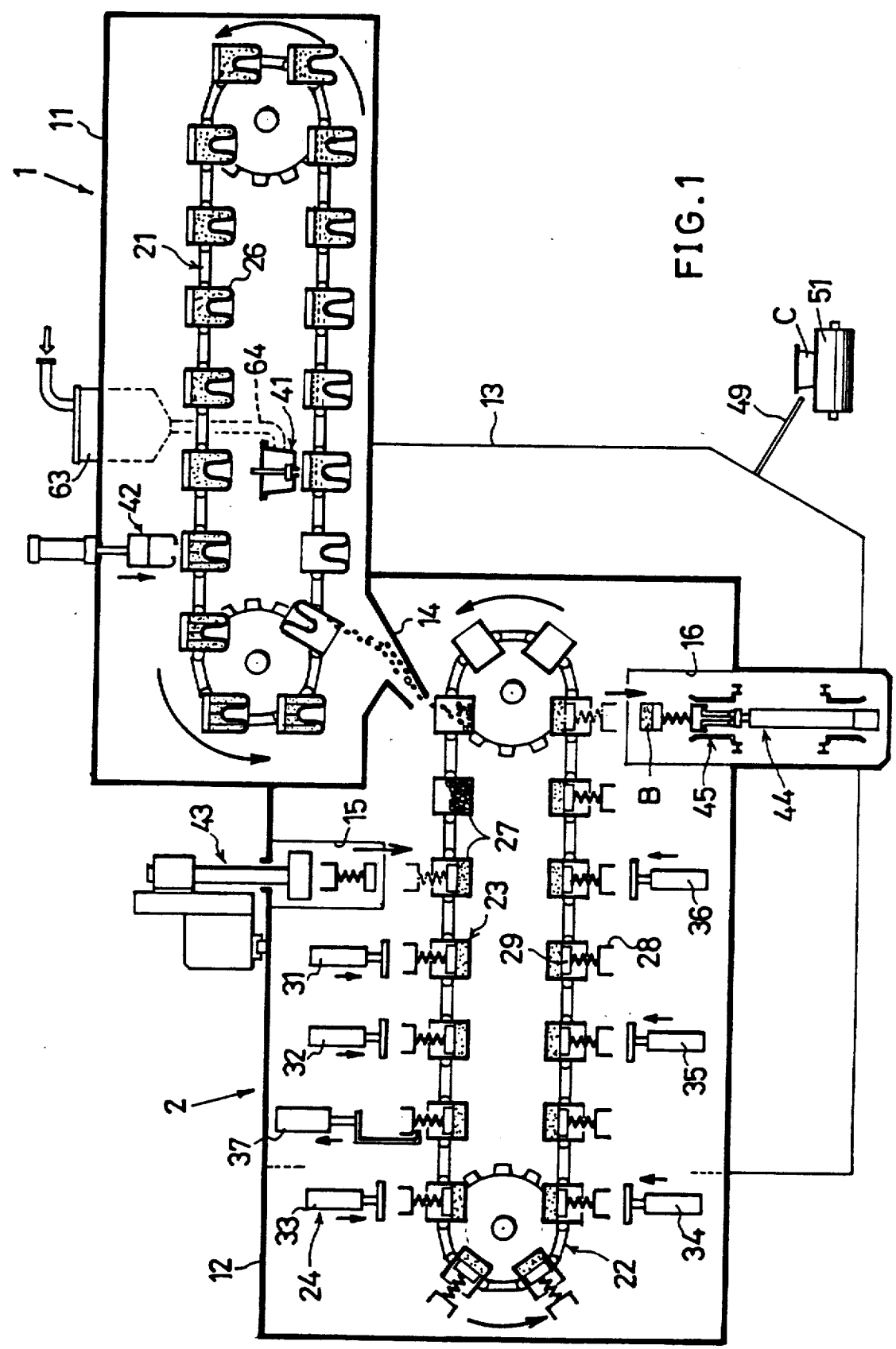
FIGS. 1 to 3 are diagrams showing the overall construction of a bean curd producing machine embodying the present invention.
Figure 2:
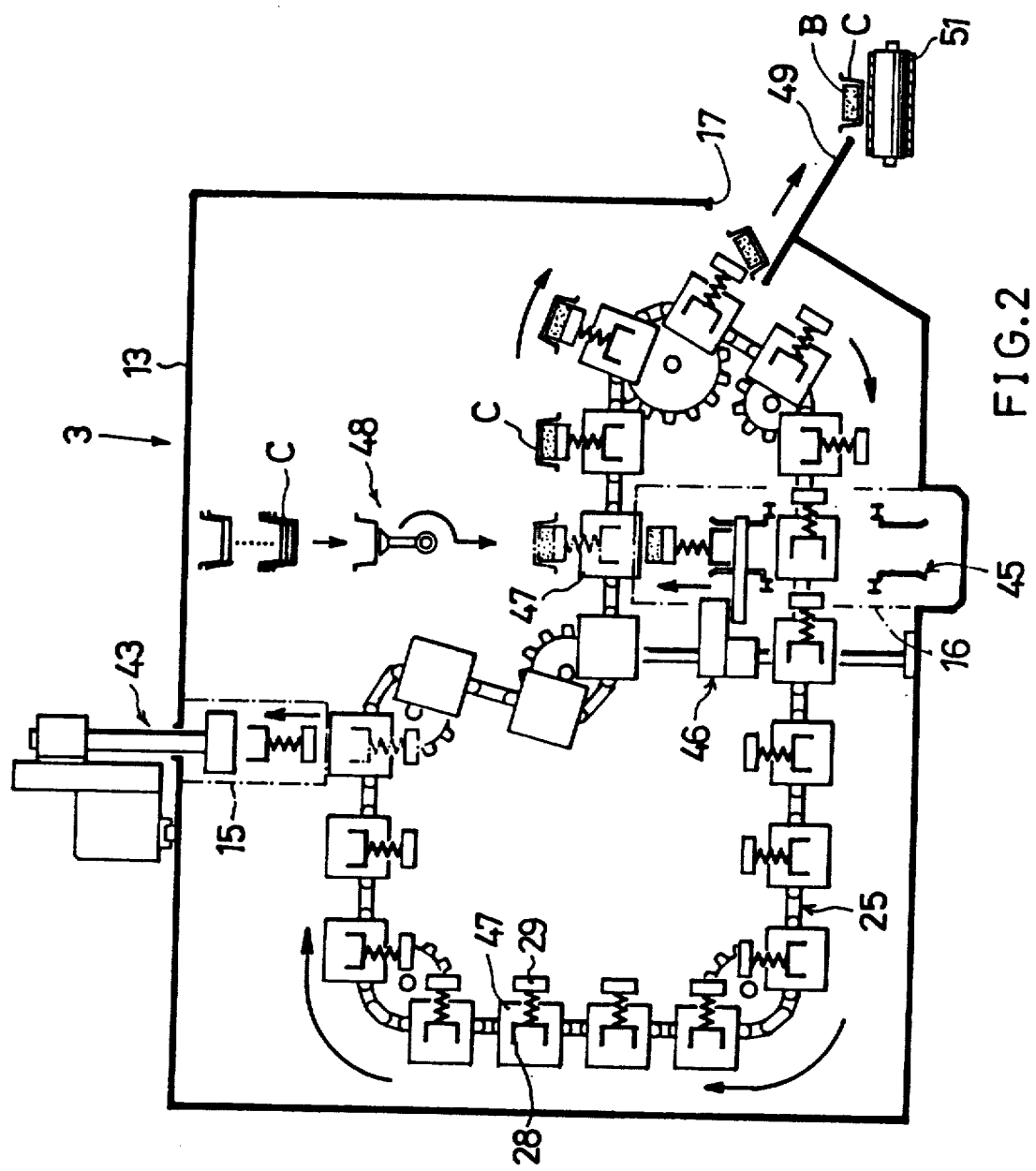
Figure 3:
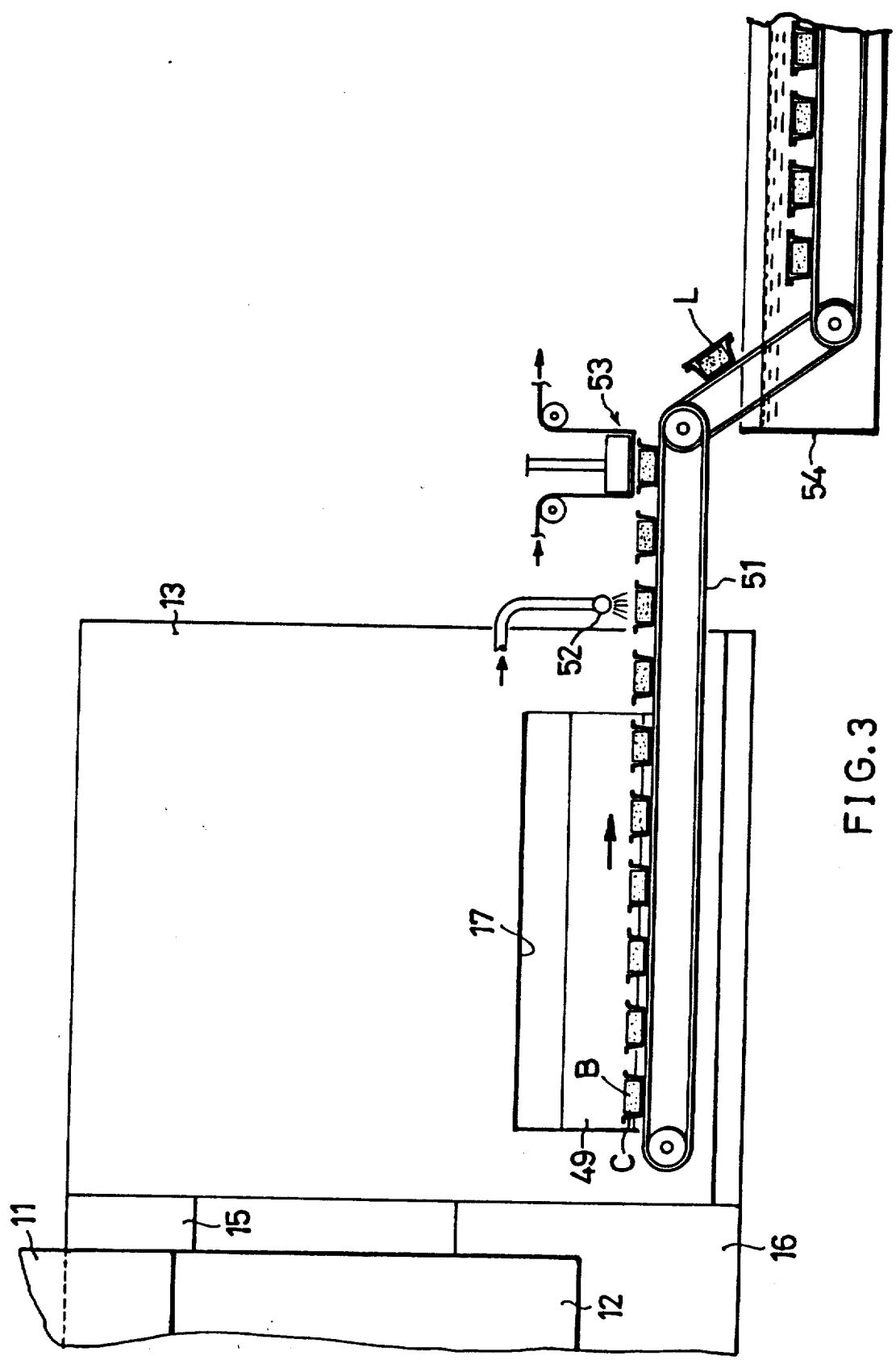

FIGS. 1 to 3 show a bean curd producing machine which consists generally of three devices, i.e., a soybean milk coagulating device 1, a dewatering-shaping device 2 for coagulated soybean milk, and a finishing device 3. The soybean milk coagulating device 1 has an upper chamber 11, and soybean milk coagulating bucket conveyor 21 housed in the upper chamber 11. The dewatering-shaping device 2 comprises a lower chamber 12, and as housed in the chamber 12, a press bucket conveyor 22, a press assembly 23 and a pressure adjusting assembly 24. The finishing device 3 comprises a side chamber 13, and a chain conveyor 25 housed in the side chamber 13 for delivering bean curd and collecting lids.

The upper chamber 11 is a steam chamber having a high internal temperature of about 95° C. The lower chamber 12 is an aseptic chamber. The bottom wall front end portion of the upper chamber 11 laps over the top wall rear end portion of the lOwer chamber 12, and a slanting transfer chute 14 is provided at the lap. The lower chamber 12 communicates with the side chamber 13 through upper and lower communication channels 15, 16. The rear wall of the side chamber 13 has a discharge outlet 17.

The coagulating bucket conveyor 21 has coagulating buckets 26 arranged in parallel rows and is driven intermittently to stop the buckets 26 in each row one after another above the chute 14. The press bucket conveyor 22 has press buckets 27 arranged in the same number of rows as the coagulating buckets 26 and is intermittently driven to stop the buckets 27 in each row one after another below the chute 14. The press bucket 27 is formed with a multiplicity of apertures not passing coagulated soybean milk therethrough but permitting the water contained in the milk to pass therethrough. The press assembly 23 has a multiplicity of press blocks each comprising a press bar 28 and lids 29 suspended from the press bar 28 and arranged at the same spacing as the rows of press buckets 28. The lid 29 is also formed with apertures like those of the press bucket for passing only water therethrough. The pressure adjusting device 24 has six pressing hydraulic cylinders 31 to 36 and one pressure reducing hydraulic cylinder 37 arranged along the path of travel of press buckets.

When each coagulating bucket 26 in each row is brought to a position slightly toward the front from the midportion of lower path of travel of the bucket, a distrubting-filling device 41 fills into the bucket 26 a mixture of soybean milk and bittern in an amount corresponding to one piece of bean curd. The bittern is magnesium chloride having a purity of at least 99.5%. The mixture is prepared by sterilizing soybean milk and bittern by heating, cooling them to a temperature lower than the coagulating temperature and mixing them together immediately before distributing and filling the mixture.

Before each coagulating bucket 26 filled with the mixture is almost brought to the front end of the upper path of its travel after being transferred from the lower path to the upper path, the mixture within the bucket 26 coagulates, and the coagulated milk is broken into prisms having a cross section of about 20 mm square by a collapsing device 42.

When the bucket 26 containing the collapsed coagulated milk is brought to above the chute, the bucket 26 is tumbled by unillustrated means, whereby the collapsed milk is allowed to fall down the chute 14 while breaking into smaller pieces and transferred into the press bucket 27 waiting near the rear end of the upper path of travel of the press bucket below the chute 14.

With the coagulated milk placed into the press bucket 27, the lid 29 is placed into the bucket 27 by a lid collecting assembly 43 at a position slightly toward the front from the waiting position.

During the travel of the press bucket 27 from the midportion of the upper path to the midportion of lower path of travel of the bucket, pressure is applied stepwise to the lid 29 by the press assembly 23 and the pressure adjusting assembly 24, whereby the milk is dewatered and shaped into bean curd.

Upon each press bucket 27 containing the shaped bean curd reaching the rear end of the lower path, the press bar 28 is pulled down along with each lid 29 by a delivery device 44, whereby the bean curd B is delivered as placed on the lid 29 from the press bucket 27.

With the bean curd B placed on each lid 29, the press bar 28 is withdrawn from the lower chamber 12 through the lower communication channel 16 and led into the side chamber 13 by a transfer device 45. Within the side chamber 13, the press bar 28 is pushed up by a pushing-up device 46 and held by a holder 47 on the chain conveyor 25.

A container feeder 48 fits an inverted container C over the bean curd B on the lid 29 of the press bar 28 held by the holder 47.

When the holder 47 advances from the upper conveyor path to an intermediate portion between the upper path and the lower conveyor path, the lid 29 is inclined rearwardly downward, whereupon the bean curd B covered with the container C falls off the lid 29 down a discharge chute 49 extending through the discharge outlet 17 and placed in an upright position onto a discharge belt conveyor 51.

During transport on the belt conveyor 51, the container C with the bean curd placed therein is filled with aseptic water by a nozzle 52, has a plastic film closure L applied thereto by a heat-sealing device 53 and is thereafter guided into a cooling bath 54. The bean curd has a temperature of at least 75° C. when delivered from the press bucket 27 and is cooled to about 10° C. for finishing by being passed through the cooling bath 54.

On the other hand, after the bean curd containing container C has been removed, the press bar 28 and each lid 29 are transported as held by the holder 47 to below the lid collecting assembly 43, whereupon the assembly 43 carries them out of the side chamber 13 into the lower chamber 12 through the upper communication channel 15.

Milk Distributing-Filling Device 41

Figure 4:
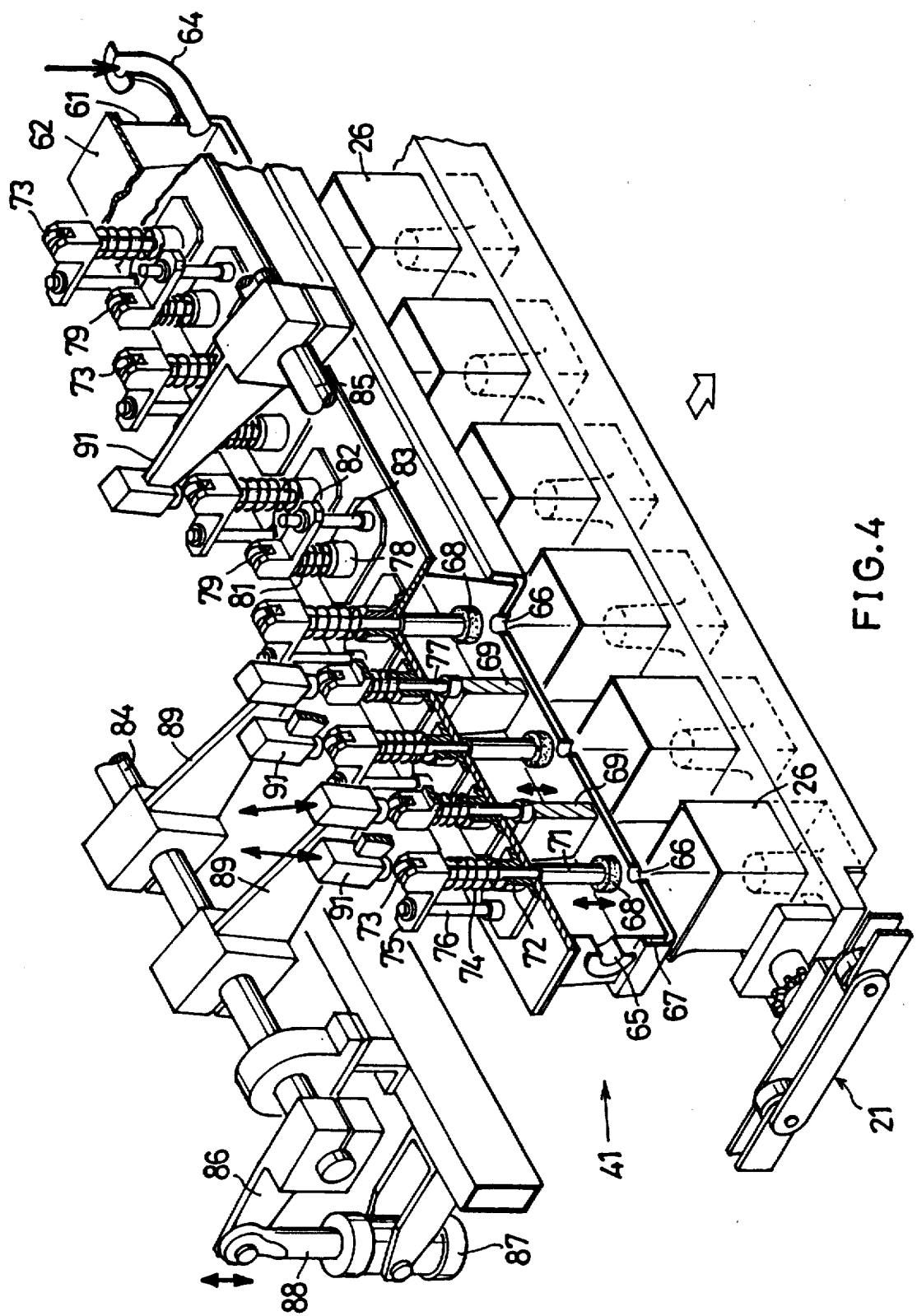
FIGS. 4 to 6 show soybean milk distributing-filling devices.
Figure 5:
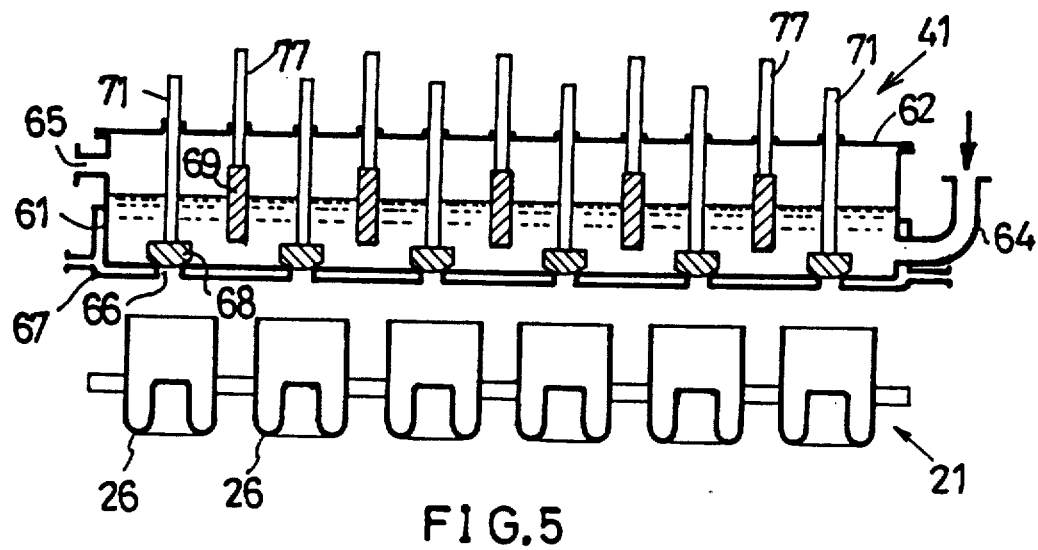

With reference to FIGS. 4 and 5, the soybean milk distributing-filling device 41 has a distributing trough 61 disposed above the lower paths of travel the coagulating buckets 26 in parallel rows and extending across the paths.

The trough 61 has a closure 62. A duct 64 extending from a mixing tank 63 (FIG. 1) is connected to the right end wall of the trough 61. In the mixing tank 63, soybean milk and coagulant therefor are mixed together in specified quantities sufficient to fill one bucket 26 in each row, and the mixture is supplied to the trough 61 through the duct 64. An air vent 65 is formed in the left end wall of the trough 61. The bottom wall of the trough 61 is formed with filling openings 66 positioned immediately above the respective bucket rows. The bottom wall is provided with a cooling water jacket 67 on its lower side.

One poppet valve 68 is disposed immediate above each filling opening 66. A vertically movable partition wall 69 is provided between the adjacent poppet valves 68. The valve 68 has a vertical valve stem 71 slidably extending through a guide sleeve 72 on the closure 62 and projecting upward beyond the closure 62. A shock absorbing member 73 carrying a roller is secured to the upper end of the valve stem 71. A coiled compression spring 74 provided around the valve stem 71 is interposed between the sleeve 72 and the shock absorbing member 73 for biasing the poppet valve 68 upward to leave the filling opening 66 open, with the valve 68 in its upper limit position. The shock absorbing member 73 is integral with a forward horizontal arm 75. A retainer-guide rod 76 extending upright from the closure 62 slidably extends through the arm 75. The partition wall 69 has a vertical rod 77 on the midportion of its upper side. Like the valve stem 71, the upper portion of the vertical rod 77 slidably extends through a guide sleeve 78 on the closure 62 and projects upward beyond the closure 62. A shock absorbing member 79 carrying a roller is also secured to the upper end of the rod 77. A coiled compression spring 81 fitted around the rod 77 is interposed between the sleeve 78 and the shock absorbing member 79 for biasing the wall 69 upward to form a soybean milk passing clearance between the trough 61 and the partition wall 69, with the wall 69 in its upper limit position. The shock absorbing member 79 at the upper end of the vertical rod 77 is integral with a rearward horizontal arm 82. A retainer-guide rod 83 extending upright from the closure 62 slidably extends through the arm 82.

Horizontal rotary shafts 84, 85 extending transversely of the bucket rows are arranged respectively to the front and rear of the distributing trough 61. A drive arm 86 is fixed at its base portion to the left end of the front rotary shaft 84. The piston rod 88 of a hydraulic cylinder 87 is connected to the forward end of the drive arm 86. Rearward pivotal arms 89 equal in number to the number of the partition walls 69 are fixed at their base portions to the rotary shaft 84 and have free ends in contact with the shock absorbing members 79 of the respective vertical rods 77. The hydraulic cylinder 87, when operated, rotates the shaft 84 to pivotally move the arms 89. When moving downward, the pivotal arms 89 cause the vertical rods 77 to push down the partition walls 69 into intimate contact with the trough 61. In this state, the interior of the trough 61 is divided into spaces arranged transversely and equal in number to the number of the coagulating bucket rows. The rear rotary shaft 85 is also rotatable by an unillustrated hydraulic cylinder. Forward pivotal arms 91 equal in number to the number of the poppet valves 68 are fixed at their base portions to the rear shaft 85 and have their free ends in contact with the shock absorbing members 73 of the respective valve stems 71. When pivotally moved downward, the forward pivotal arms 91 depress the poppet valves 68 into intimate contact with the edges of the trough bottom wall defining the filling openings 66, whereby the openings 66 are closed.

Before the mixture of soybean milk and coagulant is supplied from the mixing tank 63 to the trough 61, the openings 66 are closed, with the clearance formed between the trough 61 and each partition wall 69. In this state, the mixture is supplied. Upon completion of the supply, the partition wall 69 is lowered to eliminate the clearance, and the filling openings 66 are opened, whereupon the mixture flows out through all the filling openings 66 into the coagulating buckets 26 waiting below the respective filling openings 66. Before the mixture is supplied next, the openings 66 are closed again, and clearances are formed between the trough 61 and the partition walls 69.

Figure 6:
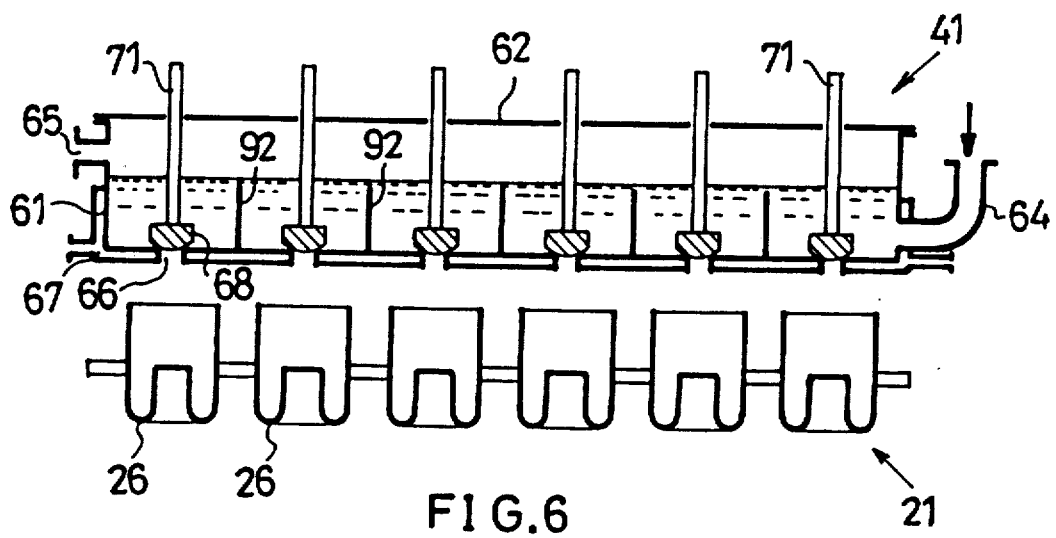

FIG. 6 shows another embodiment, wherein the movable partition walls 69 of the above embodiment are replaced by fixed partition walls 92 having a height lower than the liquid level of the mixture supplied to the distributing trough 61.

Coagulating Bucket Conveyor

Figure 7:
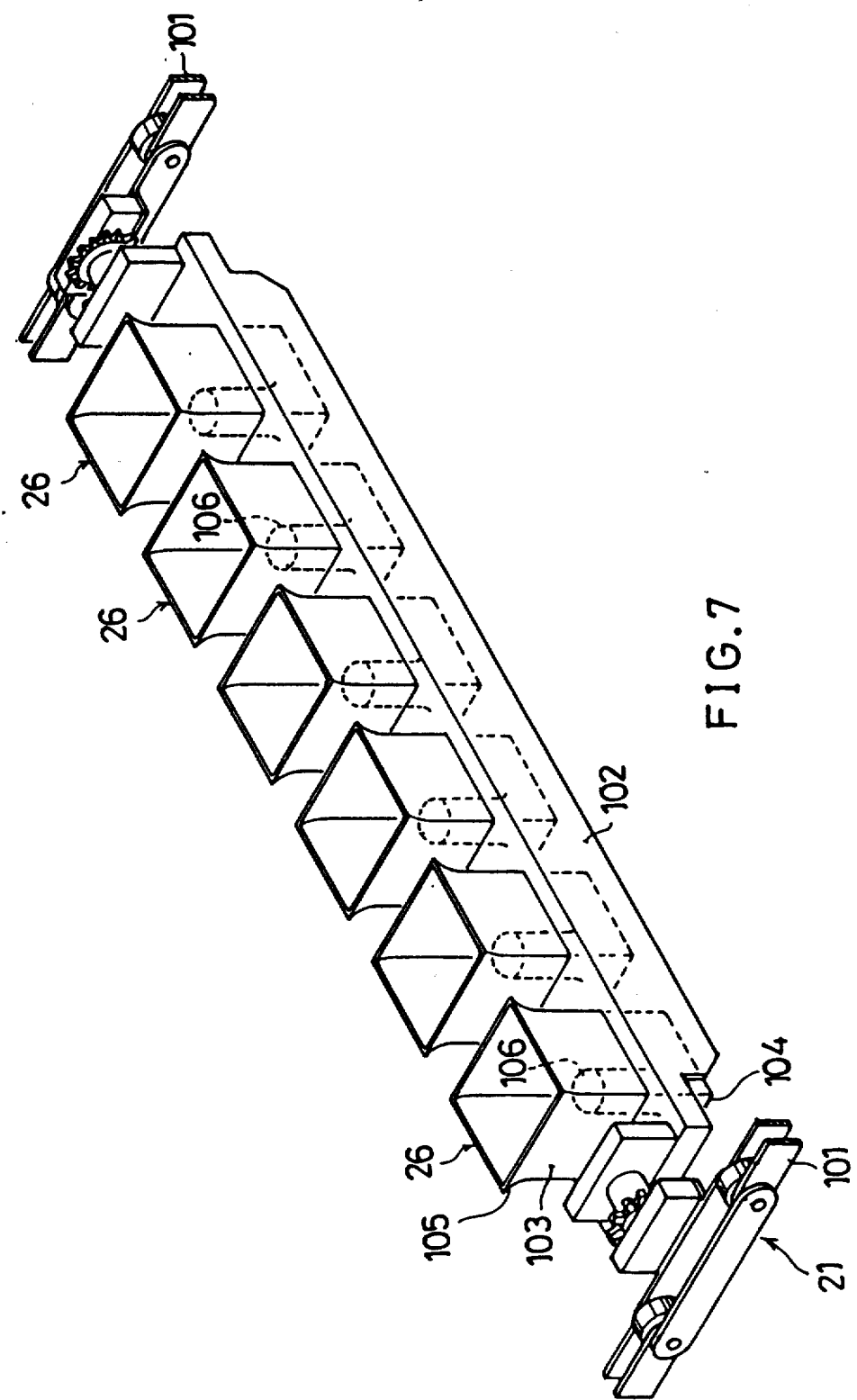
FIG. 7 is a fragmentary perspective view of a bucket conveyor.

With reference to FIG. 7, the coagulating bucket conveyor 21 has, in addition to the buckets 26, opposite side endless chains 101, and slats 102 connected between the chains. A plurality of coagulating buckets 26 are mounted on each slat 102 and equidistantly arranged longitudinally thereof.

Figure 8:
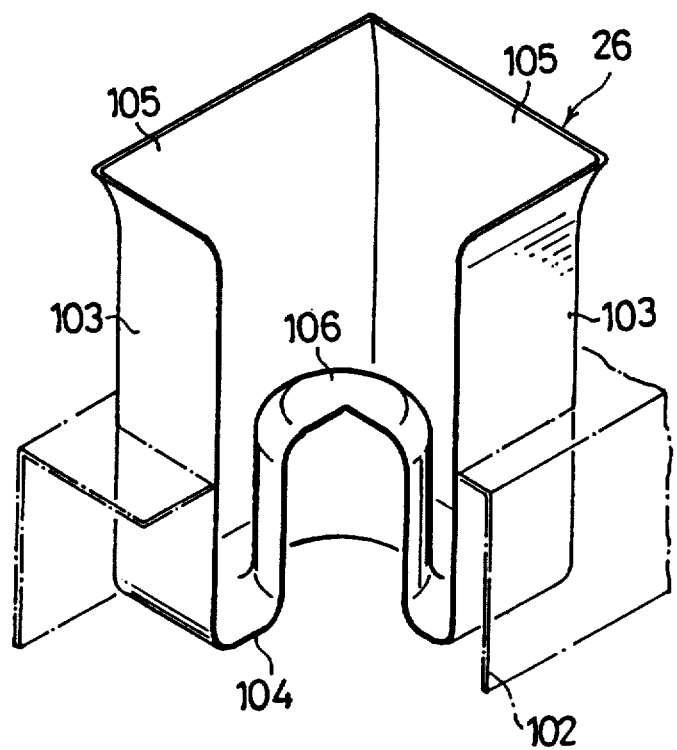
FIG. 8 is a perspective view partly broken away and showing a coagulating bucket.

As shown in greater detail in FIG. 8, the bucket 26 is prepared integrally from a stainless steel plate by drawing and comprises four side walls 103 and a bottom wall 104. The four side walls 103 have outwardly flaring upper end bent portions 105. The bottom wall 104 has an inwardly bulging portion 106 centrally thereof. This portion 106 has approximately one-half the height of the side walls 103. The bulging portion 106 is circular in horizontal section and approximately inverted U-shaped in vertical section.

As already stated, each coagulating bucket 26 is to be filled with a quantity of soybean milk corresponding to a piece of bean curd. When soybean milk is filled into the bucket 26, the liquid level of the milk almost reaches the upper end of the bucket, so that the bulging portion 106 is then completely immersed in the milk.

Coagulated Soybean Milk Collapsing Device

Figure 9:
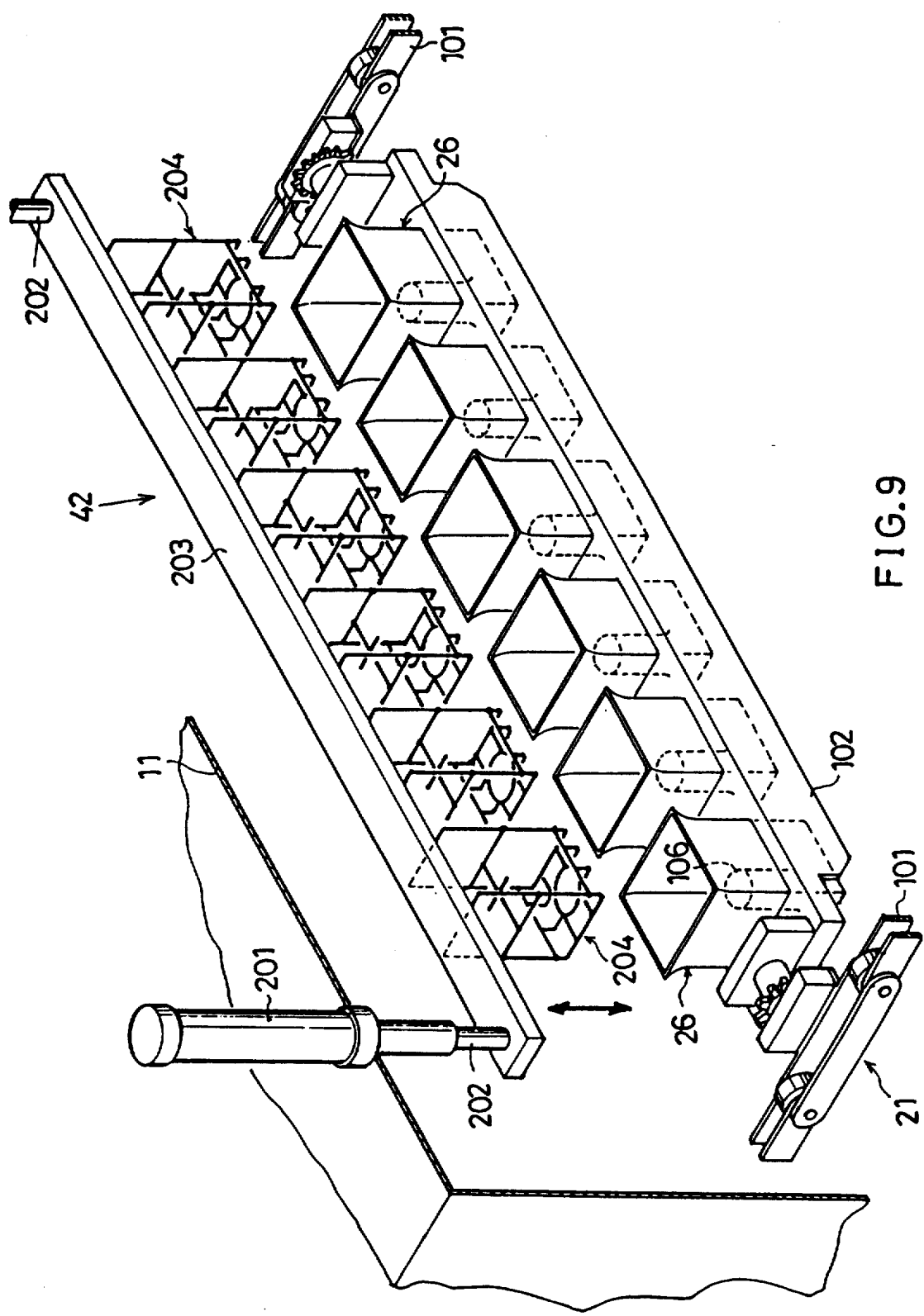
FIG. 9 is a perspective view showing a soybean milk collapsing device along with the conveyor.

With reference to FIG. 9, the collapsing device 42 comprises a pair of hydraulic cylinders 201 which are mounted as directed vertically downward on the top wall of the upper chamber 11 and are spaced apart in the transverse direction. Each cylinder 201 has a piston rod 202 extending into the upper chamber 11 through the top wall. A horizontal lift bar 203 extends between and is connected to the piston rods 202 of the two cylinders 201. The lift bar 203 extends above the upper paths of travel of the coagulating buckets 26 in parallel rows transversely of the rows. Suspended from the lift bar 203 are collapsing members 204 equal in number to the number of the coagulating bucket rows and arranged at the same spacing as the rows.

Figure 10:
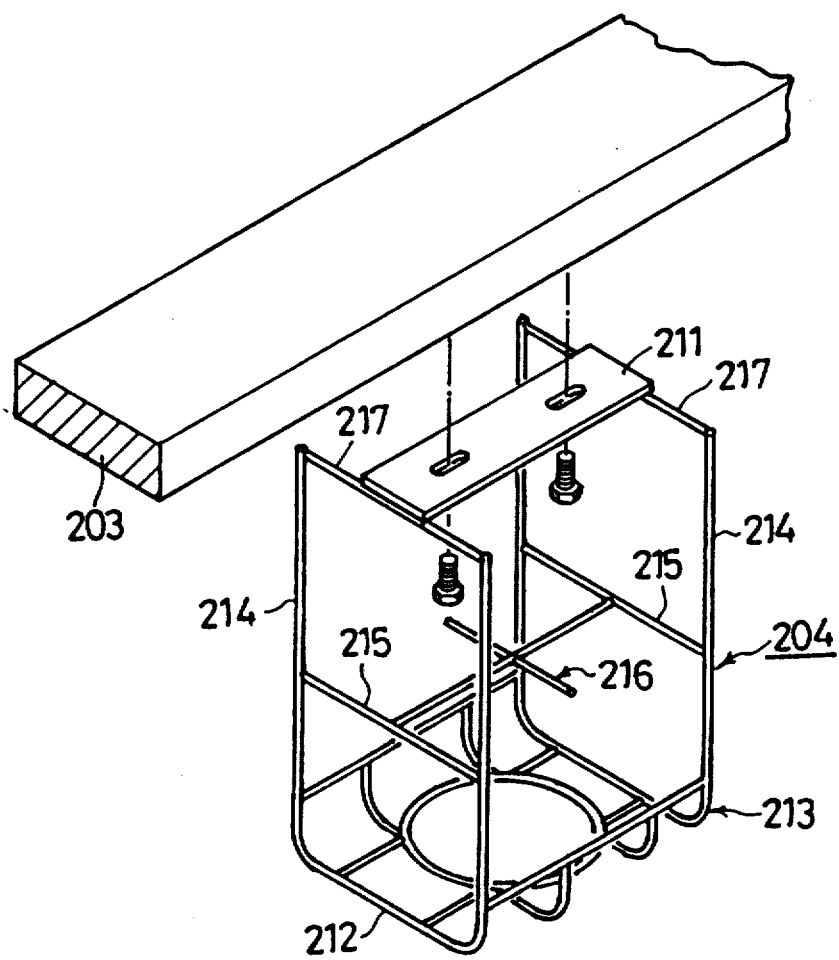
FIG. 10 is a perspective view showing a collapsing member of the collapsing device along with the coagulating bucket.
Figure 10:
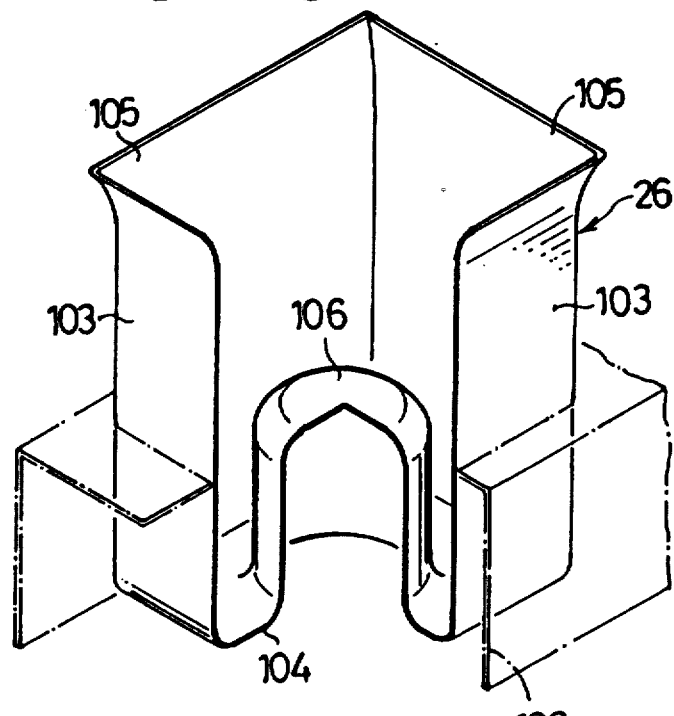

As shown in greater detail in FIG. 10, the collapsing member 204 comprises a rectangular mount plate 211 in contact with and fixed to the lower surface of the lift bar 203, a main collapsing portion 213 resembling a lattice, having an approximately horizontal rectangular outer frame 212 and disposed below the mount plate 211 at a distance therefrom, four vertical suspending rods 214 extending upright from the four corners of the outer frame 212, a pair of horizontal connecting rods 215 extending in the front-rear direction and each connected between the midportions of the suspending rods 214 on each side, an auxiliary collapsing portion 216 in the form of a cross and connected between the pair of connecting rods 215, and a pair of right and left horizontal attaching rods 217 each extending in the front-rear direction between the upper ends of the suspending rods 214 on each lateral side and secured at their intermediate portions to the respective ends of the mount plate 211. When the collapsing member 204 advances into the bucket 26, the outer frame 212 is positionable along the inner surfaces of the side walls 103 of the bucket 26 at a small distance therefrom to scrape off coagulated milk adhering to the side wall inner surfaces. The main collapsing portion 213 has a circular lattice opening centrally thereof, and the circular lattice portion is so shaped as to be positionable around the bulging portion 106 with a small clearance formed therebetween. When the collapsing member 104 advances into the bucket 26, the bulging portion 106 passes through the circular opening, thereby permitting the main collapsing portion 213 to scrape off coagulated milk adhering to the outer surface of the bulging portion 106 without interfering with this portion 106. The auxiliary collapsing portion 216 collapses the coagulated milk above the bulging portion 106.

Dewatering-Shaping Device

Figure 11:
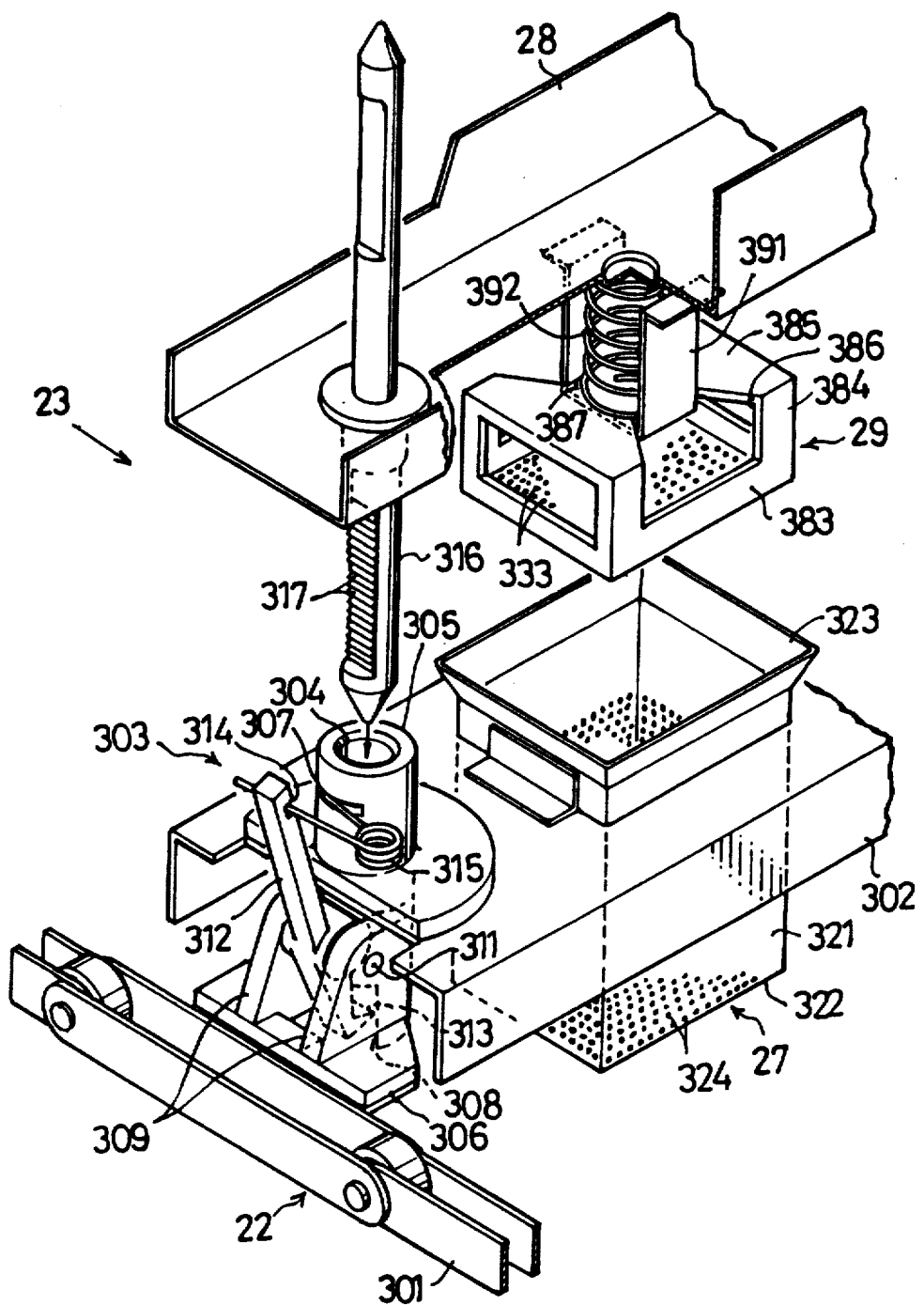
FIGS. 11 to 16 show a soybean milk dewatering-shaping device.
Figure 12:
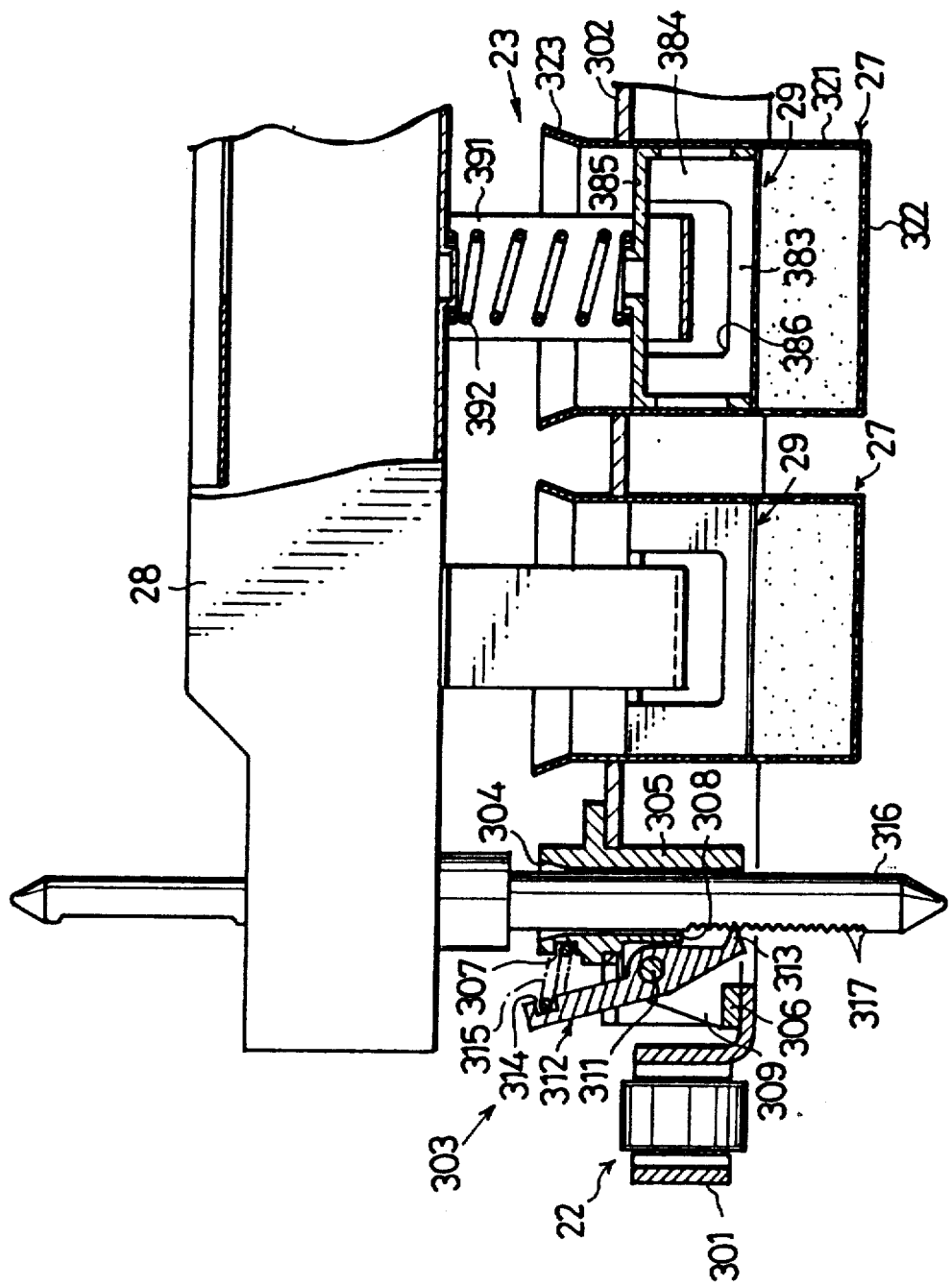

With reference to FIG. 11, the press bucket conveyor 22 has, in addition to the press buckets 27, opposite side endless chains 301, and slats 302 connected therebetween. A plurality of press buckets 27 are supported by each slat 302 and arranged equidistantly in a row longitudinally of the slat 302.

Restraining means 303 for lids 29 is provided at each end of the slat 302. The restraining means 303 has a flanged guide sleeve 305 formed with a vertical guide bore 304, and an engaging pawl support bracket 306 integral with the sleeve. The guide sleeve 305 is formed with an outward horizontal groove 307 in an outer surface portion above the flange, and an outward cutout 308 under the flange. The bracket 306 has vertical opposed walls 309 extending outward from opposite edges of the cutout portion 308. A barlike engaging piece 312 is pivotally movably supported at the midportion of its length by a horizontal pin 311 extending between and fixed to the opposed walls 309. The engaging piece 312 has an inward pawl 313 at its lower end and is formed close to its upper end with a horizontal groove 314 opposed to the horizontal groove 307 in the guide sleeve 305. A helical spring 315 engaged in these grooves 307, 314 biases the engaging piece 312 so as to project the pawl 313 into the guide bore 304.

The press bar 28 is in the form of an upwardly open channel. A vertical slide rod 316 vertically extends through each end portion of the press bar 28. Below the press bar 28, the slide rod 316 is formed with a multiplicity of outward engaging grooves 317 arranged in series longitudinally of the rod. The group of engaging grooves 317 has a cross sectional contour resembling downward sawteeth.

When the slide rod 316 is inserted into the guide bore 306, the engaging piece 312 is pressed against the bar 316 by the spring 315 with the pawl 313 engaged in one of the engaging grooves 317. In this state, the slide rod 316 is not withdrawable owing to the engagement of the pawl 313 in the groove 317. Conversely, the rod 316 can be pushed in since the pawl 317 is forced out of the groove 317 against the spring 315.

Figure 15:
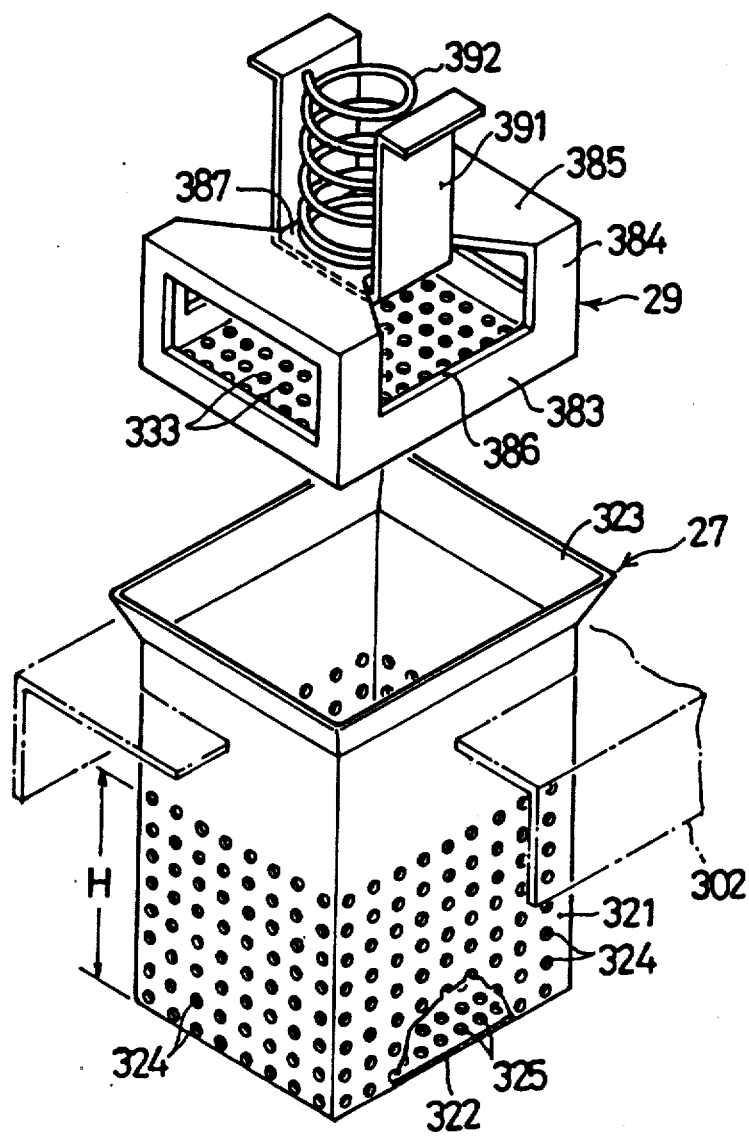
Figure 16:
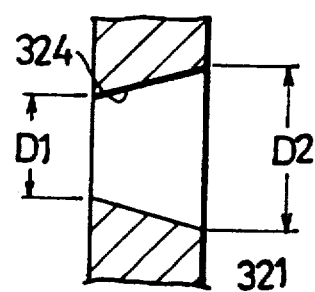

As seen in greater detail in FIG. 15, the press bucket 27 is in the form of a vertically elongated rectangular parallelepipedal box having an open upper end and comprising a peripheral wall 321 and a bottom wall 322. When the piece of bean curd to be formed is 400 c.c. in volume, the bucket 27 has a capacity sufficient to accommodate 750 c.c. of coagulated soybean milk. The peripheral wall 321 and the bottom wall 322 are made of a stainless steel sheet having a thickness of 0.3 to 1.0 mm, preferably 0.6 mm. The peripheral wall 321 has an upwardly flaring edge portion 323 defining the opening. The peripheral wall 321 and the bottom wall 322 are formed with multiplicities of dewatering apertures 324, 325, respectively. The dewatering apertures 324 of the peripheral wall 321 are formed concentrically only in the lower half of the wall 321 at a pitch of 4 mm. The height H from the bottom wall 322 to the uppermost dewatering apertures 324 of the peripheral wall 321 is approximately equal to the vertical thickness of the bean curd to be shaped. On the other hand, the dewatering apertures 325 of the bottom wall 32 are distributed substantially over the entire wall 322 and have pitch of 2.5 mm. Of these apertures 324, 325 of the two walls 321, 322, the aperture 324 of the peripheral wall 321 only is shown in greater detail in FIG. 16, while both the dewatering apertures 324, 325 are inwardly tapered. The inner-end diameter D1 of the dewatering aperture 324 is 0.6 to 1.0 mm, preferably 0.8 mm. If it is less than 0.6 mm, the apertures will be clogged up with the coagulated milk, whereas if it is greater than 1.0 mm, the coagulated milk is likely to leak. The outer-end diameter D2 of the aperture 324 is the inner-end diameter D1 plus 0.2 mm, i.e., 0.8 to 1.2 mm, preferably 1.0 mm.

The lid 29 is in the form of a flat rectangular plate of stainless steel which is freely movable upward and downward inside the peripheral wall 321. The clearance between the lid 29 and the peripheral wall 321 is so determined that the coagulated soybean milk will not leak therethrough. The lid 29 is 0.3 to 0.5 mm, preferably 0.3 mm, in thickness. If the thickness is less than 0.3 mm, the lid will not be fully satisfactory in strength, whereas if it is over 0.5 mm, the lid 29 will stick firmly to the shaped bean curd and will not be easily removed therefrom when to be removed from the bucket 27. The lid 29 is formed with a multiplicity of dewatering apertures 333 with a pitch of 1.2 mm substantially over the entire area thereof. These apertures 333 are straight and circular and have a diameter of 0.8 mm.

The lid 29 is integrally formed with a reinforcing rib 383 extending upright from the outer periphery thereof, posts 384 extending upward from the respective four corners of the upper side of the rib 383, and a roof 385 placed on the posts 384. The front and rear edges of the roof 385 are each centrally formed with a trapezoidal cutout 386 to provide a remaining reduced width portion 387.

A lid suspending member 391 approximately inverted U-shaped in vertical section is provided, with its horizontal lower end positioned beneath the reduced width portion 387 of the lid 29. The upper ends of the suspending member 391 is secured to the lower side of the press bar 28. A coiled compression spring 392 interposed between the opposed vertical portions of the member 391 is positioned between the lower surface of the press bar 28 and the reduced width lid portion 387.

Figure 13:
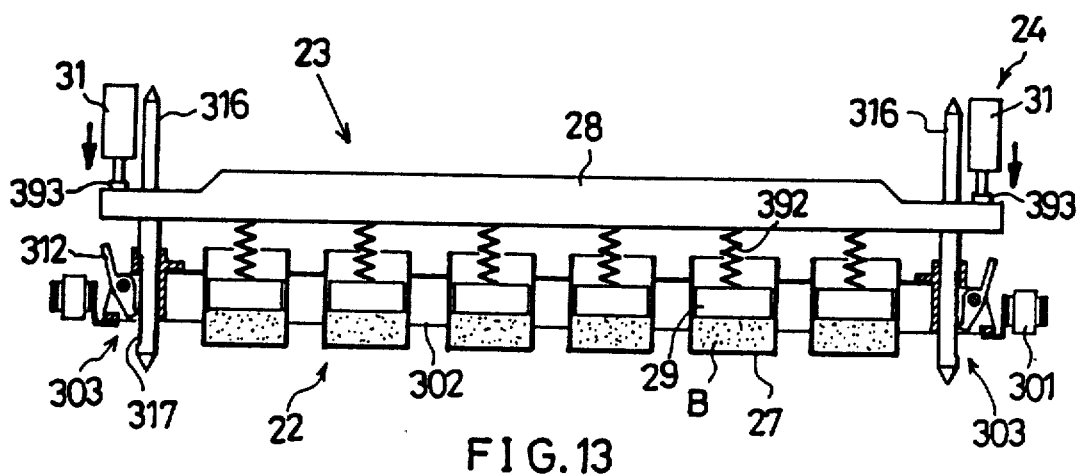

Of the six pairs of pressing hydraulic cylinders 31 to 36 of the pressure adjusting assembly 24, the pair of cylinders 31 will be described as representative examples thereof with reference to FIG. 13. The two cylinders 31 are arranged, as directed vertically downward, above the respective paths of movement of opposite ends of the press bar 28 and are fixedly supported by unillustrated means. A press member 393 is attached to the forward end of the piston rod of each cylinder 31. The piston stroke length of each of the six pairs of pressing hydraulic cylinders 31 to 36 is variable; the piston stroke length of the cylinders 31 to 36 is increased from pair to pair stepwise in the order in which they are arranged along the direction of travel of the press buckets, whereby stepwise increasing pressure is applied to the lids 29.

Figure 14:
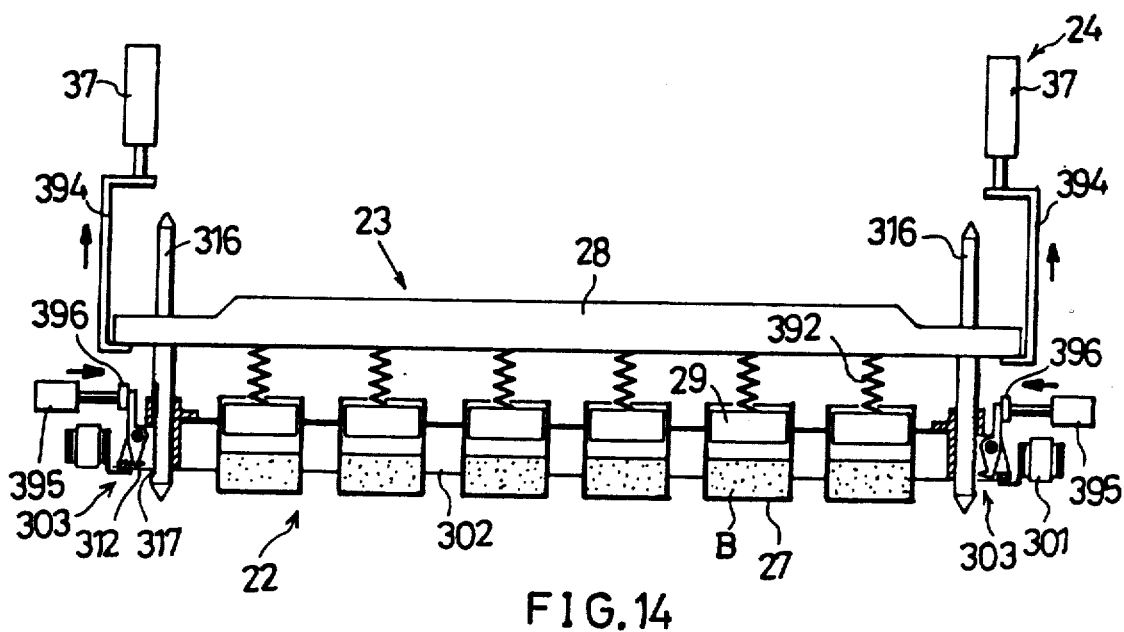

With reference to FIG. 14, the pressure reducing hydraulic cylinders 37 of the pressure adjusting assembly 24, like the cylinders 31 to 36, are fixedly arranged, as oriented vertically downward, above the respective paths of movement of opposite ends of the press bar 28. A pull-up member 394 is attached to the lower end of piston rod of each cylinder 37.

A pair of restraint removing hydraulic cylinders 395 opposed to the upper ends of the respective engaging pieces 312 are positioned immediately below the two pressure reducing hydraulic cylinders 37. An engaging piece pushing member 396 is attached to the piston rod of each cylinder 395. The cylinder 395, when operated, causes the pushing member 396 to inwardly push the upper end of the engaging piece 312, whereby the engaging piece 312 is released from the groove 317, rendering the slide rod 316 free to move upward. In this state, the pressure reducing cylinders 37 are operated to raise the pull-up members 394, whereby the press bar is slightly lifted to raise the lids 29 concerned off the coagulated soybean milk. In this way, the soybean milk being shaped is released from pressure and thereby prevented from being forced into the dewatering apertures 324, 325 and 333. This renders the milk easily removable from the bucket and the lid.

Bean Curd Delivery Device

Figure 17:
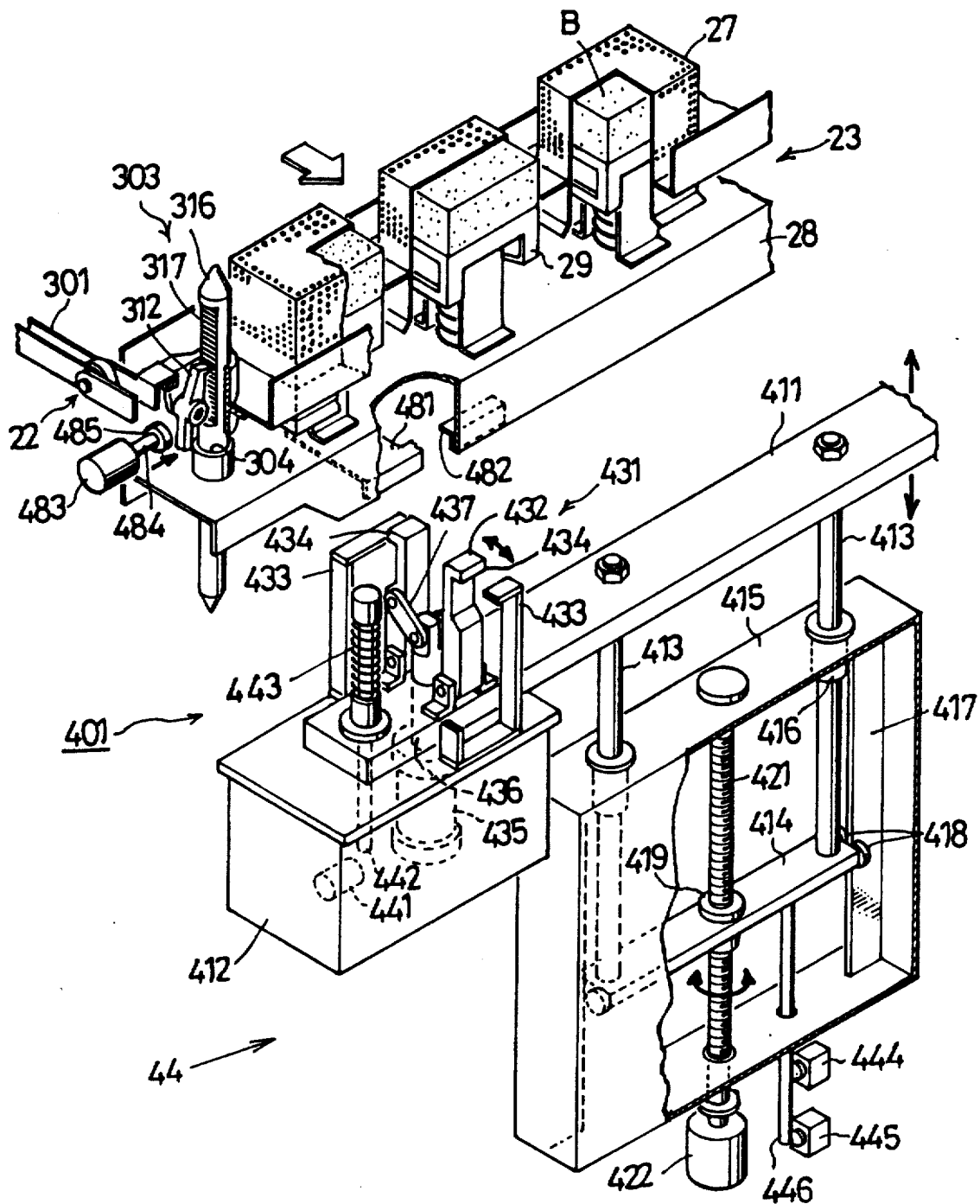
FIGS. 17 to 22 show a bean curd delivery device.

With reference to FIG. 17, the bean curd delivery device 44 comprises a lift 401 disposed below the lower path of movement of the bucket conveyor 22.

The lift 401 comprises a horizontal support bar 411 opposed to the press bar 28, a cylinder box 412 suspended from each end of the support bar 411, two parallel vertical rods 413 extending downward from the support bar 411 between the cylinder boxes 412, and a horizontal connecting bar 414 connected between the lower ends of the two vertical rods 413.

The vertical rods 413 extend through guide sleeves 416 provided on the top wall of a rectangular frame 415. Inwardly projecting vertical guide rails 417 are provided on opposite side walls of the frame 415 and opposed to each other. The connecting bar 414 is provided at each end thereof with a pair of rollers 418 which hold the guide rail 417 therebetween. A female screw member 419 is provided on the midportion of the connecting bar 414 and has a vertical screw rod 421 extending therethrough in screw-thread engagement therewith. The screw rod 421 is supported at its opposite ends by the top wall and the bottom wall of the frame 415. The lower end of the screw rod 421 extends downward beyond the frame 415 and has connected thereto the output shaft of a servomotor 422. The lift 401 moves upward or downward when the screw rod 421 is rotated in engagement with the female screw member 419 by the servomotor 422.

Figure 18:
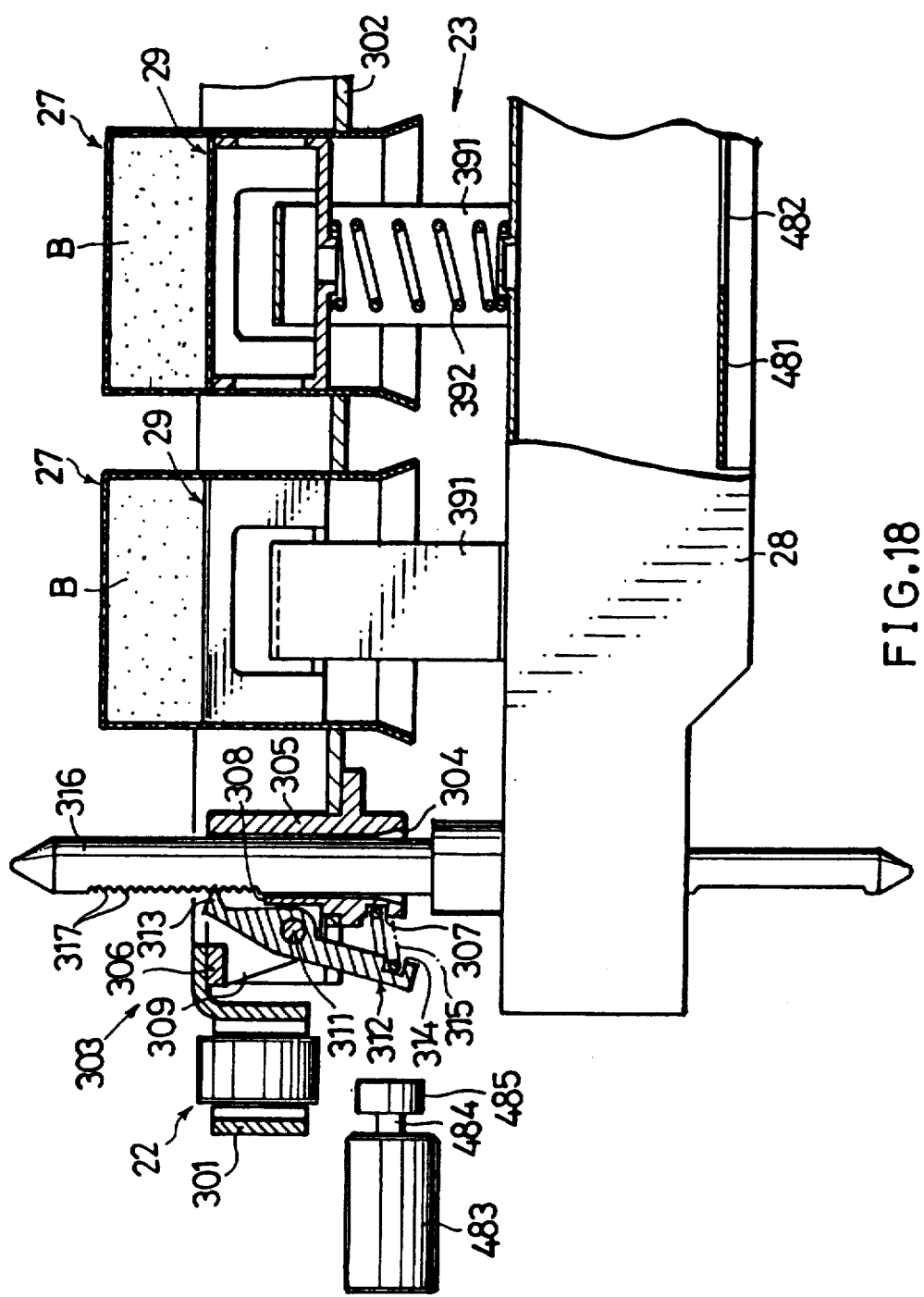

With reference to FIGS. 17 and 18, a horizontal stopper piece 481 is connected between the vertical opposed walls of the press bar 28 at a portion thereof close to each end thereof. Engaging portions 482 opposed to each other extend inward from the inner edge of the stopper piece 481 at the respective ends thereof. A press bar release hydraulic cylinder 483 is disposed at one side of and opposed to each engaging piece 312. An engaging piece pushing member 485 is attached to the piston rod 484 of the cylinder 483. When the operation of the cylinder 483 causes the pushing member 485 to push the lower end of the engaging piece 312 to pivotally move the engaging piece 312, the piece 312 is released from the engaging groove 317, rendering the slide rod 316 withdrawable from the guide bore 304.

The support bar 411 is provided at each end thereof with a chuck 431 for holding the engaging portions 482 of the stopper piece 481. The chuck 431 comprises front and rear pairs of movable chuck members 432 each in the form of a bar and fixed chuck members 433 each in the form of a frame. Each movable chuck member 432 is supported at its lower end by a horizontal pin on the support bar 411 and is movable forward and rearward. The front movable chuck member 432 has a forward holding pawl 434 at its upper end, and the rear movable chuck member 432 is provided with a rearward holding pawl 434 at its upper end. The two movable chuck members 432 are connected at the midportions thereof to the piston rod 436 of a chuck operating hydraulic cylinder 435 by a pair of links 437. The cylinder 435, when operated, pivotally moves the movable chuck members 432 between an upright position indicated in solid lines in FIG. 19 and an outwardly inclined position indicated in phantom lines. The distance between the two fixed chuck members 433 is approximately equal to the distance between the vertical side walls of the press bar 28.

Figure 19:
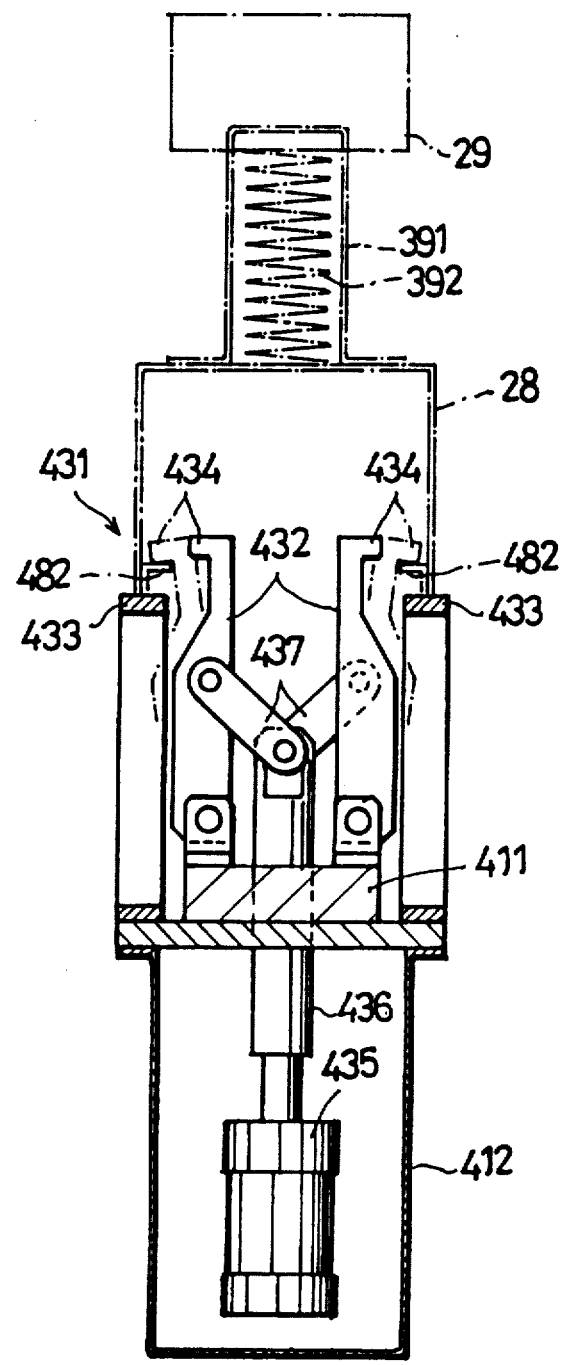

FIG. 19 shows the lift 401 in its upper limit position. The holding pawls 434 of the movable chuck members 432 in the upright position are located between the press bar side walls, with the lower ends of these side walls bearing on the upper ends of the respective fixed chuck members 433. When the movable chuck members 432 are inclined in this state, the engaging portions 482 of the stopper piece 481 are each held between the pawl 434 of the movable chuck member 432 and the upper end of the fixed chuck member 433 from above and below.

An upper limit position sensor 441 and an actuator rod 442 are disposed in the cylinder box 412. The actuator rod 442 extends through the support bar 411 and the top wall of the cylinder box 412 vertically movably and projects upward beyond the bar 411. A spring 443 for biasing the actuator rod 442 upward is provided on the projecting rod portion. The lower end of the actuator rod 442 is usually positioned slightly above the detection level of the sensor 441. When the lift 401 rises almost to the upper limit position, the actuator rod 442 comes into contact with the stopper piece 481 and is thereby depressed. When the lower end of the rod 442 is brought to the detection level of the sensor 441, the sensor 441 detects this end.

Disposed below the rectangular frame 415 are an intermediate position sensor 444 and a lower limit position sensor 445 which is downwardly spaced apart from the sensor 444. An actuator rod 446 serving for both the sensors extends through the bottom wall of the frame 415 and has its upper end connected to the connecting bar 414.

Figure 20:
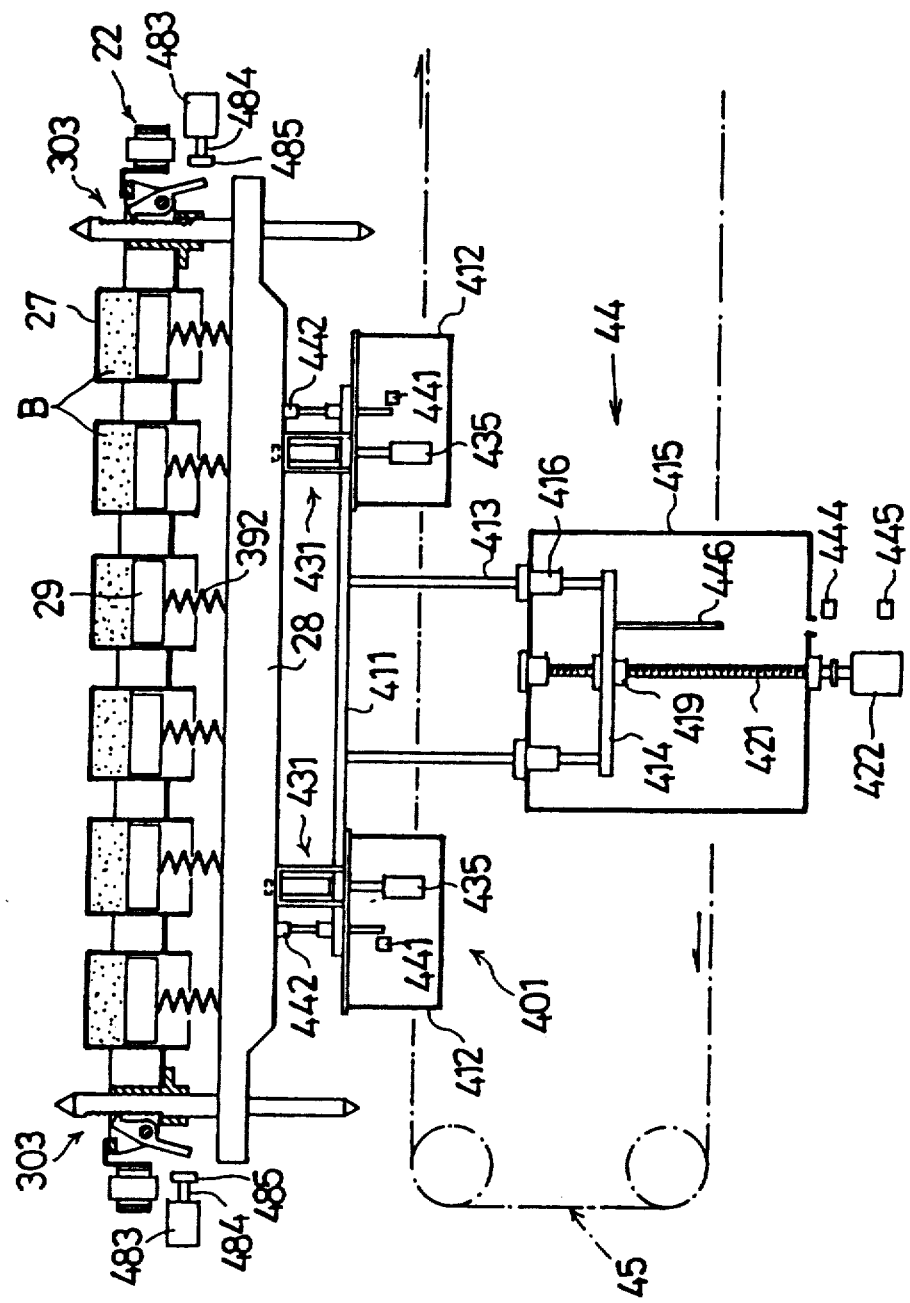
Figure 21:
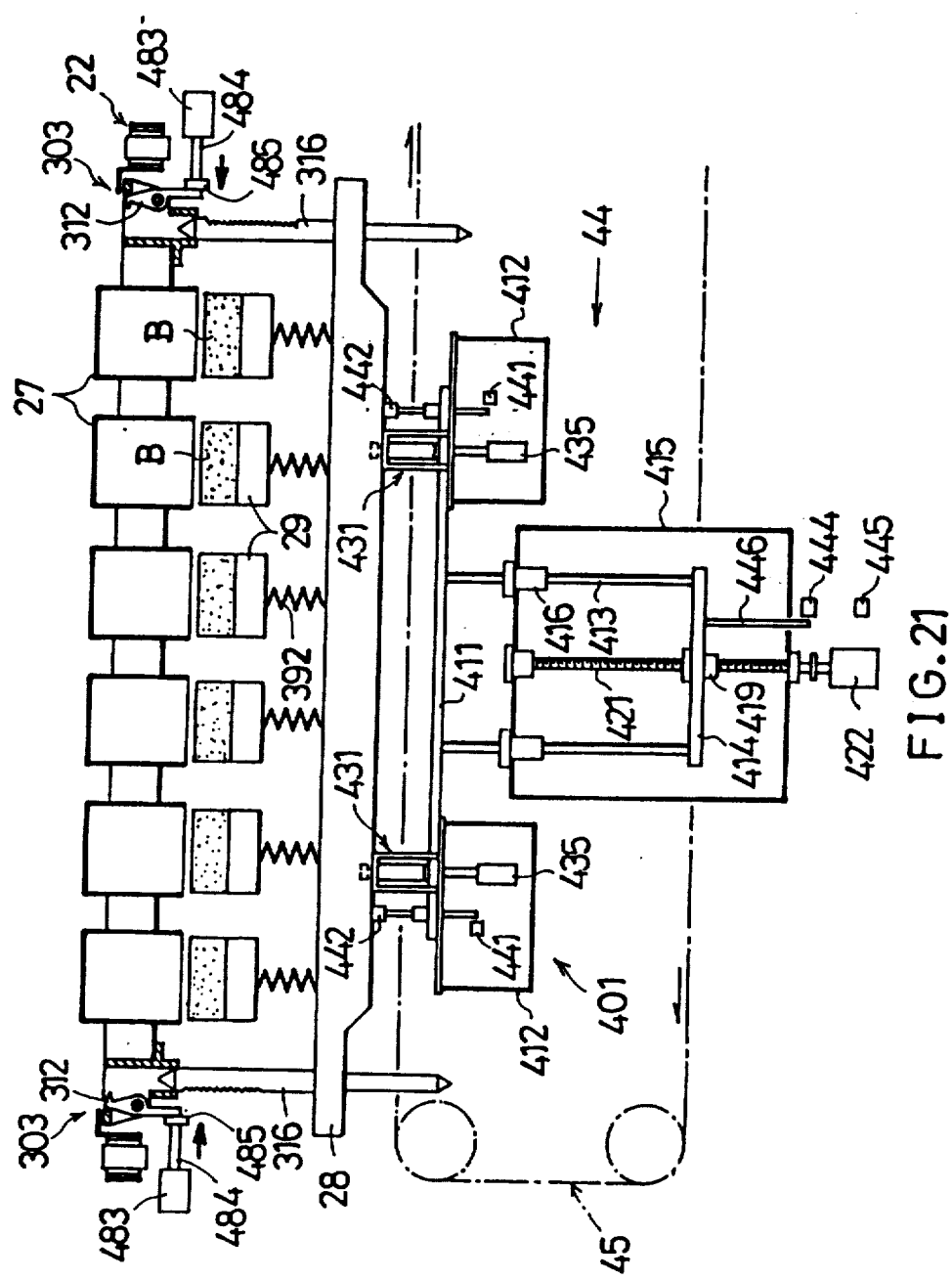
Figure 22:
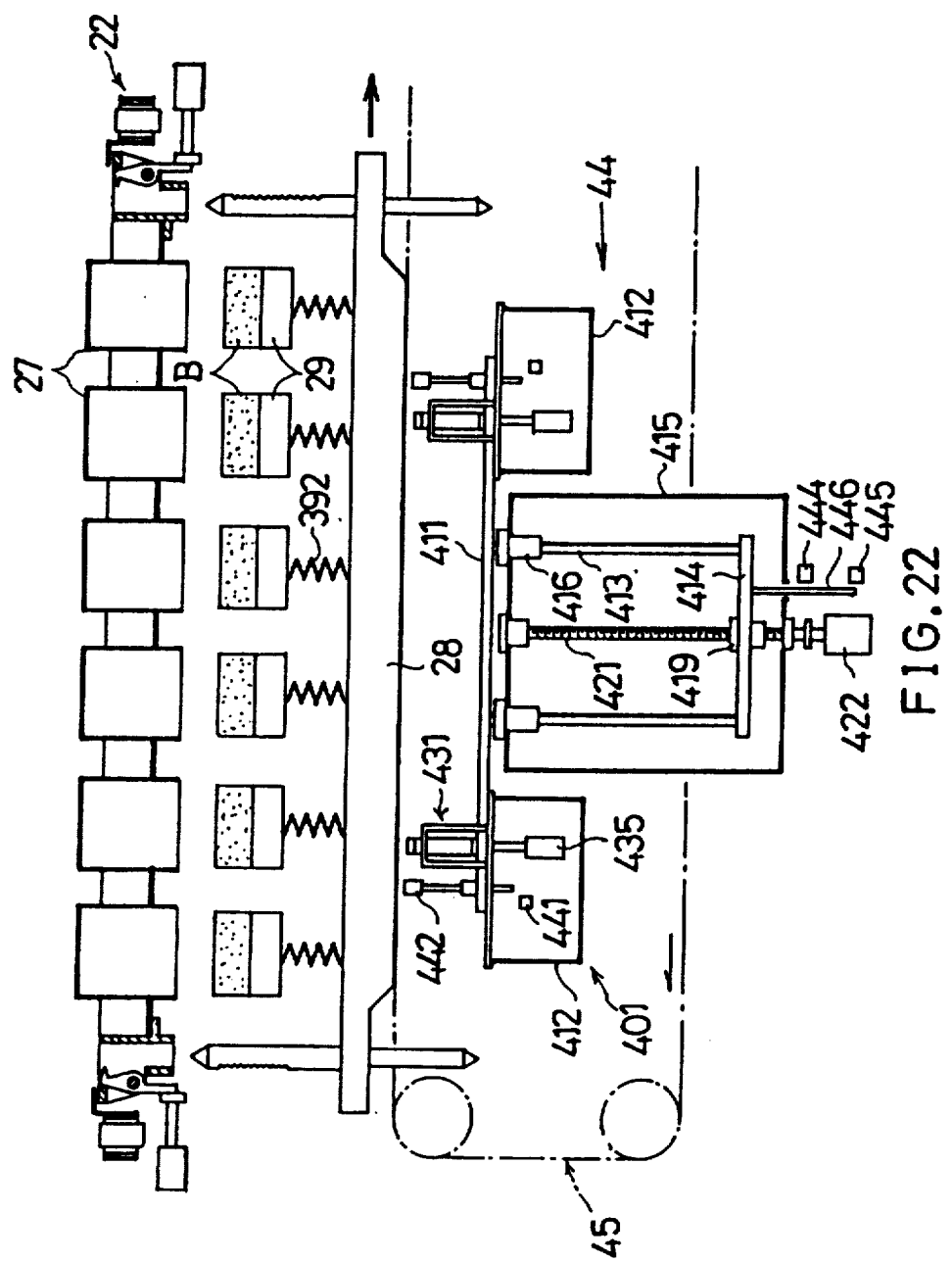

The servomotor 422 is driven by unillustrated control means so as to move the lift 401 upward and downward as will be described below. The lift 401 moves upward from the lower limit position to the upper limit position shown in FIG. 20 at a high speed. Upon the lift 401 reaching the upper limit position, the upper limit position sensor 441 detects this to stop the lift. When the lift 401 stops at the upper limit position, the press bar 28 is released from the restraint by the restraining means 303, and the press bar 28 is held by the chucks 431. When the lift 401 subsequently descends, the press bar 28 and the lids 29 concerned lower with the bean curd B placed thereon. When the lift 401 is brought to the intermediate position shown in FIG. 21, the bean curd B is completely removed from the press buckets 27 concerned. During the travel from the upper limit position to the intermediate position, the lift 401 descends at such a low speed as not to collapse the bean curd B. Upon the lift 401 descending to the intermediate position, the intermediate position sensor 444 detects this to change the descending speed of the lift 401 to a high speed. When the lift 401 descending at the high speed subsequently reaches the lower limit position as seen in FIG. 22, the lower limit position sensor 445 detects this, whereupon the lift 401 stops. With the lift 401 stopped at the lower limit position, the press bar 28 is released from the chucks 431 and delivered to the transfer device 45.

What is claimed is:

1. A machine for producing bean curd having:
   means for coagulating a mixture of soybean milk and a coagulant, and
   dewatering-shaping means for dewatering and shaping the coagulated soybean milk obtained by the coagulating means,
   the coagulating means comprising:
   a heating chamber,
   a bucket conveyor disposed within the heating chamber and having coagulating buckets arranged in parallel rows,
   a distributing trough disposed above the paths of travel of the coagulating buckets in all the rows there
   across and formed in its bottom wall with filling openings positioned immediately above the respective rows of coagulating buckets,
   feed means for mixing together the soybean milk and the coagulant in specified quantities sufficient to fill one coagulating bucket in each of the rows and intermittently feeding the resulting mixture to the distributing trough, and
   means for opening and closing the filling openings after completion of the feeding operation by the feed means and before the next feeding operation is started.

2. A machine as defined in claim 1 wherein the coagulating bucket is formed at the center of its bottom wall with a uniformly heating portion which is inwardly bulged and inverted U-shaped in vertical section.

3. A machine as defined in claim 1 wherein a lift member is disposed above the paths of travel of the coagulating buckets downstream from the distributing trough and provided with coagulated soybean milk collapsing members which are equal in number to the number of the coagulating bucket rows and which are movable into and out of the coagulating buckets.

4. A machine for producing bean curd having:
   means for coagulating a mixture of soybean milk and a coagulant, and
   dewatering-shaping means for dewatering and shaping the coagulated soybean milk obtained by the coagulating means,
   the dewatering-shaping means comprising:
   a bucket conveyor having press buckets arranged in parallel rows and each formed in required portions of the peripheral wall and the bottom wall thereof with a multiplicity of dewatering apertures not passing therethrough the coagulated soybean milk obtained by the coagulating means but permitting the water contained in the coagulated soybean milk to pass therethrough,
   a press bar movable upward and downward and disposed above the paths of travel of the press buckets in all the rows thereacross,
   lids upwardly and downwardly movably suspended from the press bar so as to be positioned immediately above the respective rows of press buckets and each downwardly biased by a spring, the lids being equal in number to the number of press bucket rows,
   means for lowering and raising the press bar so as to move the lids into and out of the respective press buckets, and
   restraining means for restraining the press bar from moving away from the press buckets but permitting the press bar to move toward the press buckets.

5. A machine as defined in claim 4 wherein the level of the uppermost dewatering apertures in the peripheral wall of the bucket from the bucket bottom is made approximately equal to the vertical thickness of the bean curd shaped.

6. A machine as defined in claim 4 wherein the dewatering apertures are tapered inward.

7. A machine as defined in claim 4 wherein the conveyor transport path is provided therealong with a plurality of press stations, and means are disposed for gradually moving the press bar toward the press buckets stepwise at every station in corresponding relation with a reduction in the volume of coagulated soybean milk in the buckets.

8. A machine as defined in claim 7 wherein between the adjacent press stations are arranged means for releasing the press bar from the means for restraining the press bar from moving away from the press buckets, and means for moving the released press bar away from the press buckets.

9. A machine for producing bean curd having:
   means for coagulating a mixture of soybean milk and a coagulant,
   dewatering-shaping means for dewatering and shaping the coagulated soybean milk obtained to prepare bean curd, and
   delivery means for delivering the bean curd from the dewatering-shaping means,
   the dewatering-shaping means comprising:
   a bucket conveyor having press buckets arranged in parallel rows and each formed in a required portion with a multiplicity of dewatering apertures not passing therethrough the coagulated soybean milk obtained by the coagulating means but permitting the water contained in the coagulated soybean milk to pass therethrough,
   a press bar movable upward and downward and disposed above the paths of travel of the press buckets in all the rows thereacross,
   lids upwardly and downwardly movably suspended from the press bar so as to be positioned immediately above the respective rows of press buckets and each downwardly biased by a spring, the lids being equal in number to the number of press bucket rows,
   means for lowering and raising the press bar so as to move the lids into and out of the respective press buckets, and
   restraining means for restraining the press bar from moving away from the press buckets but permitting the press bar to move toward the press buckets,
   the delivery means comprising:
   a lift disposed below the lower path of movement of the bucket conveyor for transporting bean curd as placed in the press buckets,
   release means for releasing the press bar from the restraining means when the press bar is positioned above the lift,
   a chuck provided on the lift for releasably holding the press bar,
   the lift being in an upper limit position when the chuck holds the press bar, in an intermediate position immediately after the bean curd as placed on the lids is removed from the press buckets, and in a lower limit position immediately before the bean curd as placed on the lids is to be transported to the next process, and
   means for moving the lift upward from the lower limit position to the upper limit position at a high speed and for moving the lift downward from the upper limit position to the intermediate position at a low speed and from the intermediate position to the lower limit position at a high speed.

10. A machine as defined in claim 9 wherein the lift is provided with a sensor for producing a signal for stopping the lift at the upper limit position when an actuator is brought into contact with the press bar positioned above the lift, and the release means releases the press bar from the restraining means upon the lift reaching the upper limit position, the chuck holds the press bar, and the lift is thereafter lowered to remove the bean curd placed on the lids from the press buckets.

* * * * *